(12) United States Patent
Himoto et al.

(10) Patent No.: US 9,016,426 B2
(45) Date of Patent: Apr. 28, 2015

(54) EXHAUST TREATMENT UNIT

(71) Applicant: Komatsu Ltd., Tokyo (JP)

(72) Inventors: Manabu Himoto, Kyotanabe (JP); Osamu Nishimura, Joyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/240,846

(22) PCT Filed: Nov. 19, 2012

(86) PCT No.: PCT/JP2012/079928
§ 371 (c)(1),
(2) Date: Feb. 25, 2014

(87) PCT Pub. No.: WO2014/061166
PCT Pub. Date: Apr. 24, 2014

(65) Prior Publication Data
US 2015/0027800 A1 Jan. 29, 2015

(30) Foreign Application Priority Data
Oct. 16, 2012 (JP) .................. 2012-228777

(51) Int. Cl.
*B60K 13/04* (2006.01)
*F01N 3/28* (2006.01)
*F01N 3/24* (2006.01)
(52) U.S. Cl.
CPC .............. *F01N 3/2882* (2013.01); *B60K 13/04* (2013.01); *F01N 3/24* (2013.01)
(58) Field of Classification Search
USPC .................. 60/0.324; 180/296, 309
See application file for complete search history.

(56) References Cited

U.S. PATENT DOCUMENTS

| 3,933,216 A * | 1/1976 | Irwin ............................. 180/309 |
| 4,029,167 A * | 6/1977 | Fox et al. ....................... 180/309 |
| 5,197,698 A * | 3/1993 | Bartholomew .................. 248/60 |
| 6,412,587 B1 * | 7/2002 | Weimert et al. ............... 180/309 |
| 7,918,297 B2 * | 4/2011 | Schneider .................... 180/68.4 |

(Continued)

FOREIGN PATENT DOCUMENTS

| JP | 2012-2016 A | 1/2012 |
| JP | 2012-97413 A | 5/2012 |

(Continued)

OTHER PUBLICATIONS

The International Search Report for the corresponding international application No. PCT/JP2012/079928, issued on Nov. 19, 2012.

*Primary Examiner* — Jeffrey J Restifo
*Assistant Examiner* — Erez Gurari
(74) *Attorney, Agent, or Firm* — Global IP Counselors, LLP

(57) ABSTRACT

An exhaust treatment unit treats an exhaust gas from an engine of a work vehicle. The exhaust treatment unit includes a first exhaust treatment device, a second exhaust treatment device, and a bracket. The first exhaust treatment device and the second exhaust treatment device are attached to the bracket. The bracket includes an edge part having an attachment portion configured to be attached to a vehicle body frame of the work vehicle, and a main body part having a convex shape downwardly bulged from the edge part. A bottom part of the second exhaust treatment device is positioned below the attachment portion. A work vehicle preferably includes the exhaust treatment unit, the engine and the vehicle body frame.

20 Claims, 14 Drawing Sheets

(56) References Cited

U.S. PATENT DOCUMENTS

| | | | |
|---|---|---|---|
| 8,191,668 B2* | 6/2012 | Keane et al. | 180/296 |
| 8,851,224 B2* | 10/2014 | Hayashi et al. | 180/309 |
| 2010/0031644 A1 | 2/2010 | Keane et al. | |
| 2010/0122865 A1* | 5/2010 | Okada | 180/309 |
| 2010/0126791 A1* | 5/2010 | Okada | 180/296 |
| 2010/0186382 A1* | 7/2010 | Schroeder et al. | 60/286 |
| 2011/0030353 A1* | 2/2011 | Kamiya et al. | 60/297 |
| 2011/0120085 A1* | 5/2011 | Saito et al. | 60/272 |
| 2012/0000196 A1* | 1/2012 | Niwa et al. | 60/602 |
| 2012/0247861 A1* | 10/2012 | Mizuno et al. | 180/296 |
| 2013/0001005 A1* | 1/2013 | Nakamura et al. | 180/296 |
| 2013/0213726 A1* | 8/2013 | Okada | 180/309 |
| 2013/0343853 A1* | 12/2013 | Sato et al. | 414/719 |

FOREIGN PATENT DOCUMENTS

| | | |
|---|---|---|
| JP | 2012-184602 A | 9/2012 |
| WO | 2011/152306 A1 | 12/2011 |

* cited by examiner

EXHAUST TREATMENT UNIT

CROSS-REFERENCE TO RELATED APPLICATIONS

This application is a U.S. National stage application of International Application No. PCT/JP2012/079928, filed on Nov. 19, 2012. This U.S. National stage application claims priority under 35 U.S.C. §119(a) to Japanese Patent Application No. 2012-228777, filed in Japan on Oct. 16, 2012, the entire contents of which are hereby incorporated herein by reference.

BACKGROUND

1. Field of the Invention

The present invention relates to an exhaust treatment unit for treating exhaust gas from an engine of a work vehicle.

2. Background Information

Work vehicles such as a hydraulic excavator are equipped with an exhaust treatment device. The exhaust treatment device is connected to an engine through a connection pipe in order to treat the exhaust gas from the engine. The exhaust treatment device includes a diesel particulate filter device and a selective catalytic reduction device. The diesel particulate filter device reduces particulates contained in the exhaust gas. The selective catalytic reduction device reduces nitrogen oxide (NOx) contained in the exhaust gas. In some cases, these two exhaust treatment devices are disposed in a single unit for facilitating maintenance, and the unit is installed in a work vehicle. Such unit is referred to as an exhaust treatment unit When the exhaust treatment unit is attached to the engine such that the exhaust treatment unit is supported by the engine, such heavy product is designed to be disposed on the upper part of the engine. Therefore, large load for attaching the exhaust treatment unit to the engine acts on a bracket. When enlarged for a reinforcement purpose, the bracket is inevitably increased in its weight.

Therefore, it is preferable to attach the exhaust treatment unit to a support member other than the engine. For example, in Japan Laid-open Patent Application Publication No. JP-2012-097413(A), a table is mounted on an upper frame through support legs. The diesel particulate filter device and the selective catalytic reduction device are disposed on the top surface of the table.

SUMMARY

When the diesel particulate filter device and the selective catalytic reduction device are disposed in the exhaust treatment unit while being aligned on the same horizontal plane, an engine compartment is enlarged, and thereby, a vehicle body is enlarged. Accordingly, when the exhaust treatment unit is disposed outwardly over the vehicle body frame, the exhaust treatment unit is inevitably located in a high position, and thereby, the work vehicle is inevitably increased in its size. In other words, an engine hood, covering the exhaust treatment unit, is inevitably located in a high position.

It is an aim of the present invention to provide an exhaust treatment unit whereby enlargement of a work vehicle can be suppressed.

Solution to Problems

An exhaust treatment unit according to a first aspect of the present invention is an exhaust treatment unit for treating an exhaust gas from an engine of a work vehicle, and comprises a first exhaust treatment device, a second exhaust treatment device and a bracket. The first exhaust treatment device and the second exhaust treatment device are attached to the bracket. The bracket includes an edge part and a main body part. The edge part includes an attachment portion to be attached to a vehicle body frame of the work vehicle. The main body part has a convex shape downwardly bulged from the edge part. A bottom part of the second exhaust treatment device is positioned below the attachment portion.

An exhaust treatment unit according to a second aspect of the present invention relates to the exhaust treatment unit according to the first aspect, and the main body part includes a first support portion and a second support portion. The first support portion supports the first exhaust treatment device. The second support portion supports the second exhaust treatment device. The second support portion is positioned below the first support portion.

An exhaust treatment unit according to a third aspect of the present invention relates to the exhaust treatment unit according to the first aspect, and the main body part includes a first support portion and a second support portion. The first support portion supports the first exhaust treatment device. The second support portion supports the second exhaust treatment device. A vertical distance between the attachment portion and the first support portion is less than a vertical distance between the attachment portion and the second support portion.

An exhaust treatment unit according to a fourth aspect of the present invention relates to the exhaust treatment unit according to the second or third aspect, and the first exhaust treatment device is a diesel particulate filter device and the second exhaust treatment device is a selective catalytic reduction device. The selective catalytic reduction device is supported by the second support portion while being positioned below the diesel particulate filter device.

An exhaust treatment unit according to a fifth aspect of the present invention relates to the exhaust treatment unit according to any of the second to fourth aspects, and further comprises a relay connection pipe for connecting the first exhaust treatment device and the second exhaust treatment device. The relay connection pipe is disposed over and adjacently to the second exhaust treatment device. A vertical distance between a lowermost part of the second exhaust treatment device and the attachment portion is greater than a length of half of an outer diameter of the relay connection pipe.

An exhaust treatment unit according to a sixth aspect of the present invention relates to the exhaust treatment unit according to any of the first to fifth aspects, and the first exhaust treatment device includes a connection port between the first exhaust treatment device and a connection pipe on a lowermost part thereof. The connection pipe connects the engine and the first exhaust treatment device. The main body part includes an insertion hole into which the connection port is inserted.

An exhaust treatment unit according to a seventh aspect of the present invention relates to the exhaust treatment unit according to the sixth aspect, and a lowermost part of the connection port is positioned above a lowermost part of the main body part.

An exhaust treatment unit according to an eighth aspect of the present invention relates to the exhaust treatment unit according to any of the second to seventh aspects, and the first and second exhaust treatment devices have cylindrical shapes. The first and second support portions have contact surfaces respectively fitted to outer peripheral surfaces of the first and second exhaust treatment devices.

An exhaust treatment unit according to a ninth aspect of the present invention relates to the exhaust treatment unit according to the eighth aspect, and the contact surfaces have convex shapes bulged downwards.

A work vehicle according to a tenth aspect of the present invention includes an engine, a vehicle body frame and an exhaust treatment unit according to any of the first to ninth aspects. The vehicle body frame includes a plurality of pillar members disposed upright on a revolving frame supporting the engine and a beam member mounted to upper ends of the pillar members. The exhaust treatment unit is supported by the vehicle body frame.

A work vehicle according to an eleventh aspect of the present invention relates to the work vehicle according to the tenth aspect, and the bracket is attached to the beam member by means of the attachment portion. A bottom part of the second exhaust treatment device is positioned below the beam member.

A work vehicle according to a twelfth aspect of the present invention relates to the work vehicle according to the tenth or eleventh aspect, and further comprises a connection pipe for connecting the engine and the first exhaust treatment device. The main body part is positioned above the connection pipe.

A work vehicle according to a thirteenth aspect of the present invention relates to the work vehicle according to the eleventh aspect, and a lowermost part of the first exhaust treatment device is disposed above the beam member.

A work vehicle according to a fourteenth aspect of the present invention relates to the work vehicle according to any of the tenth to thirteenth aspects, and the main body part includes a cut-out portion. The cut-out portion is positioned over a cylinder head of the engine.

In the exhaust treatment unit according to the first aspect of the present invention, the bottom part of the second exhaust treatment device is positioned below the attachment portion. Accordingly, the second exhaust treatment device is partially positioned below members of the vehicle body frame supporting the exhaust treatment unit. Therefore, the height of the exhaust treatment unit can be restrained, and thereby, enlargement of the work vehicle can be suppressed.

In the exhaust treatment unit according to the second aspect of the present invention, the second support portion is positioned below the first support portion. In other words, the first exhaust treatment device is disposed in a easily detachable position within the exhaust treatment unit. Due to the structure such that the first exhaust treatment device is supported by the first support portion, the detachment of the first exhaust treatment device, which requires frequent maintenance, can be easily performed. Therefore, the maintenance performance of the first exhaust treatment device can be enhanced.

In the exhaust treatment unit according to the third aspect of the present invention, the vertical distance between the attachment portion and the first support portion is less than that between the attachment portion and the second support portion. Due to the structure such that the first exhaust treatment device is disposed on the first support portion that is separated away from the attachment portion at a shorter vertical distance, the detachment of the first exhaust treatment device, which requires frequent maintenance, can be easily performed. Therefore, the maintenance performance of the first exhaust treatment device which requires frequent maintenance can be enhanced.

In the exhaust treatment unit according to the fourth aspect of the present invention, the diesel particulate filter device is disposed above the selective catalytic reduction device. In other words, the diesel particulate filter device is disposed in a easily detachable position within the exhaust treatment unit. The diesel particulate filter device collects particulates contained in the exhaust gas. Accordingly, the maintenance frequency thereof is higher than that of the selective catalytic reduction device. Therefore, the diesel particulate filter device which requires frequent maintenance can be upwardly hoisted and be thus easily detached from the vehicle.

In the exhaust treatment unit according to the fifth aspect of the present invention, the vertical distance between the lowermost part of the second exhaust treatment device and the attachment portion is greater than the length of half of the outer diameter of the second connection pipe. Therefore, when disposed outwardly over the vehicle body frame, the exhaust treatment unit can be positioned low. Consequently, enlargement of the work vehicle can be suppressed.

In the exhaust treatment unit according to the sixth aspect of the present invention, the first exhaust treatment device includes the connection port for connecting the first exhaust treatment device and the connection pipe (referred to as a first connection pipe in the following explanation) for connecting the engine and the first exhaust treatment device, and the main body part includes the insertion hole into which the connection port is inserted. Further, the connection port is set on the lowermost part of the first exhaust treatment device. Accordingly, either a work of connecting the first exhaust treatment device to the first connecting pipe or a work of disconnecting the first exhaust treatment device from the first connecting pipe can be easily performed in performing the maintenance of the exhaust treatment device. Therefore, the maintenance performance of the diesel particulate filter device can be further enhanced.

In the exhaust treatment unit according to the seventh aspect of the present invention, the lowermost part of the connection port is positioned above the lowermost part of the main body part. Accordingly, the connection port does not contact with the ground even when the exhaust treatment unit is detached from the work vehicle and is placed on the ground. Therefore, the maintenance performance of the diesel particulate filter device can be further enhanced.

In the exhaust treatment unit according to the eighth aspect of the present invention, the first and second support portions have contact surfaces fitted to the outer peripheral surfaces of the first and second exhaust treatment devices. Therefore, the first and second support portions can stably support the exhaust treatment devices.

In the exhaust treatment unit according to the ninth aspect of the present invention, the contact surfaces have convex shapes bulged downwards. Thus, the contact surfaces are bulged in the same direction as the main body part. Accordingly, when stamping is performed, the die forming of the contact surfaces can be simultaneously performed with that of the main body part. Therefore, manufacturing cost can be reduced.

In the work vehicle according to the tenth aspect of the present invention, it is possible to achieve advantageous effects similar to those achieved by the exhaust treatment unit according to any of the first to ninth aspects of the present invention.

In the work vehicle according to the eleventh aspect of the present invention, the bracket of the exhaust treatment device is attached to the beam member, which enhances flexibility in disposing the first exhaust treatment device and the second exhaust treatment device in the horizontal direction.

In the work vehicle according to the twelfth aspect of the present invention, the main body part is positioned above the connection pipe, which can prevent the connection pipe from interfering with the detachment in detaching the first exhaust treatment device. Therefore, the maintenance performance of the first exhaust treatment device can be further enhanced.

In the work vehicle according to the thirteenth aspect of the present invention, the lowermost part of the first exhaust treatment device is disposed above the beam member supporting the exhaust treatment unit. Therefore, the first exhaust treatment device can be easily upwardly hoisted and be thus easily detached from the vehicle.

In the work vehicle according to the fourteenth aspect of the present invention, the main body part includes the cut-out portion positioned over the cylinder head of the engine. Accordingly, the exhaust treatment unit is not required to be detached from the work vehicle while the maintenance of the engine is performed. Therefore, the maintenance performance of the engine can be enhanced.

DETAILED DESCRIPTION OF EMBODIMENT(S)

First Exemplary Embodiment

Figure 1:
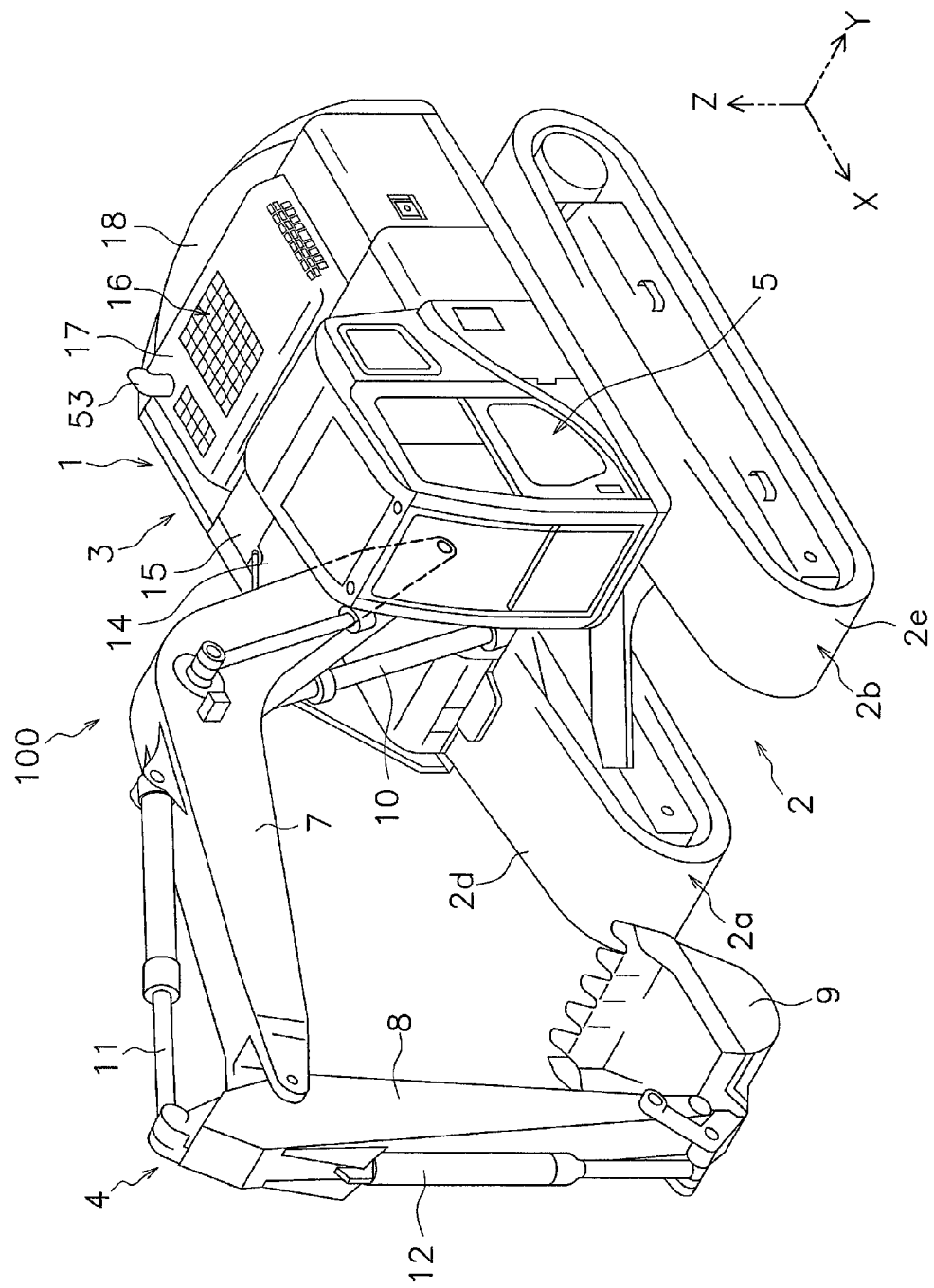
FIG. 1 is a perspective view of a work vehicle according to an exemplary embodiment of the present invention.

FIG. 1 illustrates a work vehicle 100 according to a first exemplary embodiment of the present invention. In the present exemplary embodiment, explanation will be made by exemplifying a hydraulic excavator as the work vehicle. The work vehicle 100 includes a vehicle main body 1 and a working implement 4.

The vehicle main body 1 includes a travelling unit 2 and a revolving unit 3. The travelling unit 2 includes a pair of drive units 2a and 2b. The drive units 2a and 2b respectively have crawler belts 2d and 2e. The drive units 2a and 2b are configured to drive the crawler belts 2d and 2e by means of driving force from an engine 21 to be described (see FIG. 2) for causing the work vehicle 100 to run. It should be noted that in the following explanation, the term "back-and-forth direction" refers to the back-and-forth direction of the vehicle main body 1. In other words, the term "back-and-forth direction" refers to the back-and-forth direction seen from an operator seated in a cab 5. Further, the term "right-and-left direction" or "lateral direction" refers to the vehicle width direction of the vehicle main body 1. In other words, the right-and-left direction, the vehicle width direction or the lateral direction is the right-and-left direction seen from the aforementioned operator. Further, in the drawings, the back-and-forth direction, the right-and-left direction and an up-and-down direction are represented with an x-axis, a y-axis and a z-axis, respectively.

The revolving unit 3 is mounted on the travelling unit 2. The revolving unit 3 is configured to be able to revolve with respect to the travelling unit 2. Further, the revolving unit 3 is provided with the cab 5. The revolving unit 3 includes a fuel tank 14, a hydraulic oil tank 15, an engine compartment 16 and a counterweight 18. The fuel tank 14 stores fuel for driving the engine 21 to be described hereinafter. The fuel tank 14 is disposed in front of the hydraulic oil tank 15. The hydraulic oil tank 15 stores hydraulic oil to be discharged from a hydraulic pump 23 to be described hereinafter (see FIG. 2). The hydraulic oil tank 15 is disposed in alignment with the fuel tank 14 in the back-and-forth direction.

The engine compartment 16 accommodates a variety of devices including the engine 21 and the hydraulic pump 23 as described below. The engine compartment 16 is disposed behind the cab 5, the fuel tank 14 and the operating oil tank 15. The top side of the engine compartment 16 is covered with an engine hood 17. The counterweight 18 is disposed behind the engine compartment 16.

The working implement 4 is attached to the center position on the front part of the revolving unit 3. The working implement 4 includes a boom 7, an arm 8, a bucket 9, a boom cylinder 10, an arm cylinder 11 and a bucket cylinder 12. The base end of the boom 7 is rotatably coupled to the revolving unit 3. On the other hand, the tip end of the boom 7 is rotatably coupled to the base end of the arm 8. The tip end of the arm 8 is rotatably coupled to the bucket 9. The boom cylinder 10, the arm cylinder 11 and the bucket cylinder 12 are hydraulic cylinders configured to be driven by the hydraulic oil discharged from the hydraulic pump 23 to be described hereinafter. The boom cylinder 10 is configured to actuate the boom 7. The arm cylinder 11 is configured to actuate the arm 8. The bucket cylinder 12 is configured to actuate the bucket 9. The working implement 4 is configured to be driven by the driving of the cylinders 10, 11 and 12.

Figure 2:
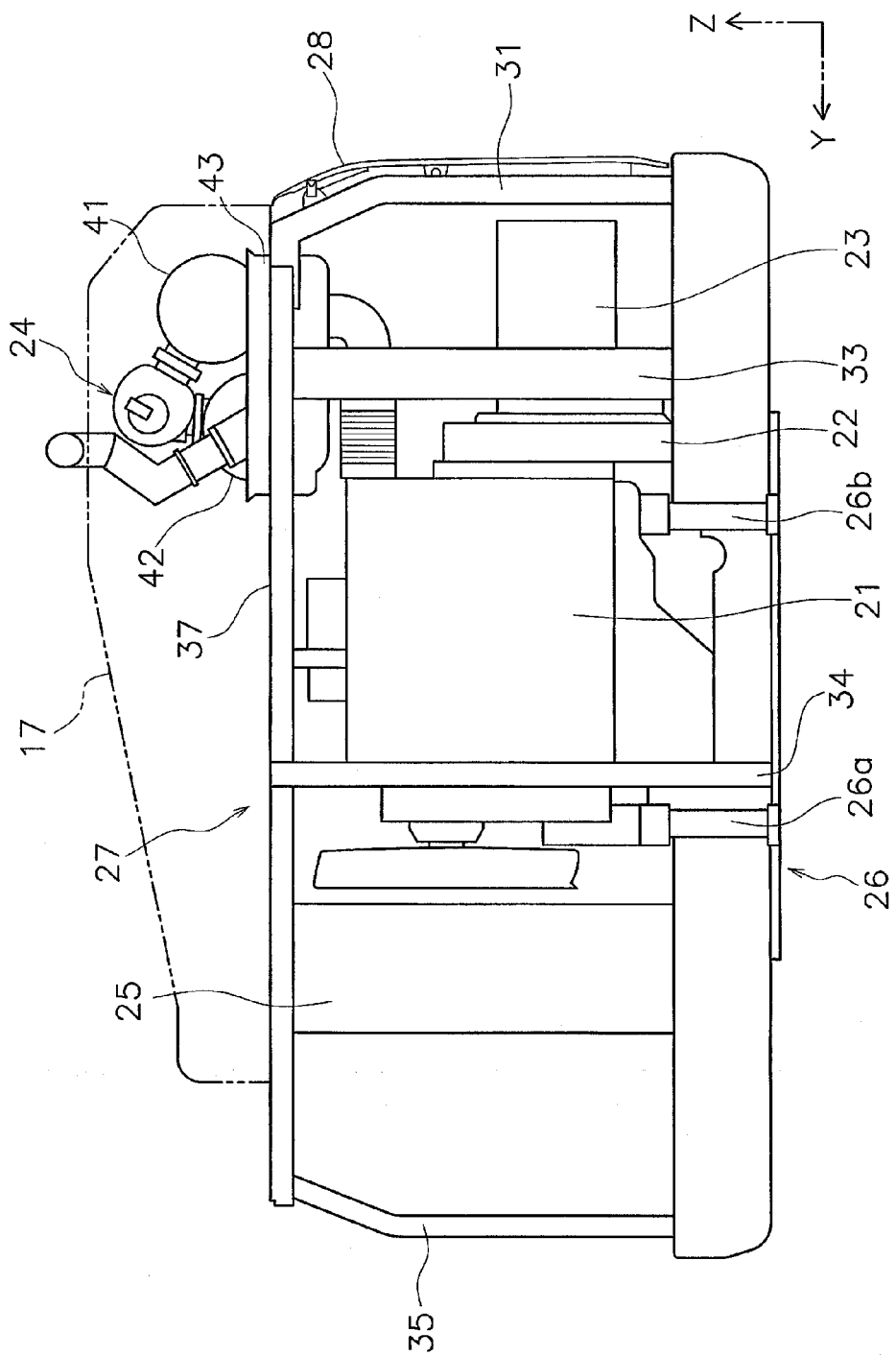
FIG. 2 is a diagram of an internal structure of an engine compartment seen from rear.
Figure 3:
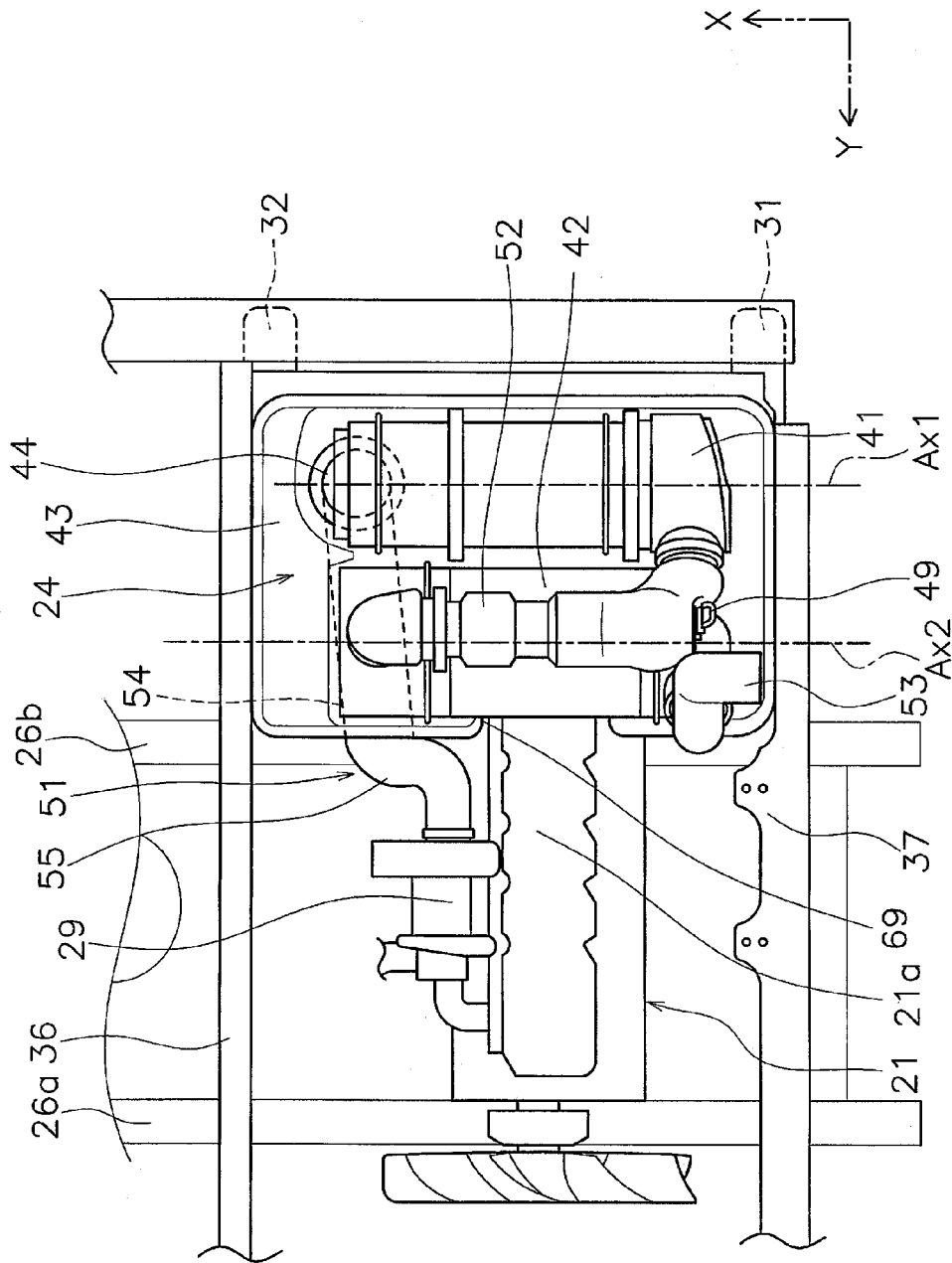
FIG. 3 is a diagram of the internal structure of the engine compartment seen from above.

FIG. 2 is a diagram of the inner structure of the engine compartment 16 seen from rear. FIG. 3 is a diagram of the inner structure of the engine compartment 16 seen from above. As illustrated in FIG. 2, the engine 21, a flywheel housing 22, the hydraulic pump 23 and an exhaust treatment unit 24 are disposed in the engine compartment 16. Further, a cooling device 25, including a radiator and an oil cooler, is disposed in the engine compartment 16. The cooling device 25, the engine 21, the flywheel housing 22 and the hydraulic pump 23 are disposed in alignment with each other in the vehicle width direction.

As illustrated in FIG. 2, the work vehicle 100 includes a revolving frame 26 and a vehicle body frame 27. The revolving frame 26 includes a pair of center frames 26a and 26b extended in the back-and-forth direction. The revolving frame 26 supports the engine 21 through rubber dampers.

The vehicle body frame 27 is disposed upright on the revolving frame 26. The vehicle body frame 27 is disposed in the surrounding of a variety of devices such as the engine 21 and the hydraulic pump 23. An exterior cover 28 is attached to the vehicle body frame 27. It should be noted that FIG. 2 illustrates only a part of the exterior cover 28. The engine hood 17 illustrated in FIG. 1 is also attached to the vehicle body frame 27.

As illustrated in FIGS. 2 and 3, the vehicle body frame 27 includes a plurality of pillar members 31 to 35 and a plurality of beam members 36 and 37. The pillar members 31 to 35 are disposed to extend upwardly from the revolving frame 26. The beam members 36 and 37 are supported by the upper ends of the pillar members 31 to 35. The beam members 36 and 37 are supported by the pillar members 31 to 35. Specifically, as illustrated in FIG. 3, the plural beam members 36 and 37 include the first beam member 36 and the second beam member 37. The first beam member 36 and the second beam member 37 are disposed away from each other in the back-and-forth direction. The first beam member 36 is disposed in front of the engine 21. The second beam member 37 is disposed behind the engine 21.

The hydraulic pump 23 is configured to be driven by the engine 21. As illustrated in FIG. 2, the hydraulic pump 23 is disposed laterally to the engine 21. In other words, the hydraulic pump 23 is disposed in alignment with the engine 21 in the vehicle width direction. The hydraulic pump 23 is disposed at a position lower than the top surface of the engine 21.

The flywheel housing 22 is disposed between the engine 21 and the hydraulic pump 23. The flywheel housing 22 is attached to a lateral surface of the engine 21. On the other hand, the hydraulic pump 23 is attached to a lateral surface of the flywheel housing 22.

Figure 4:
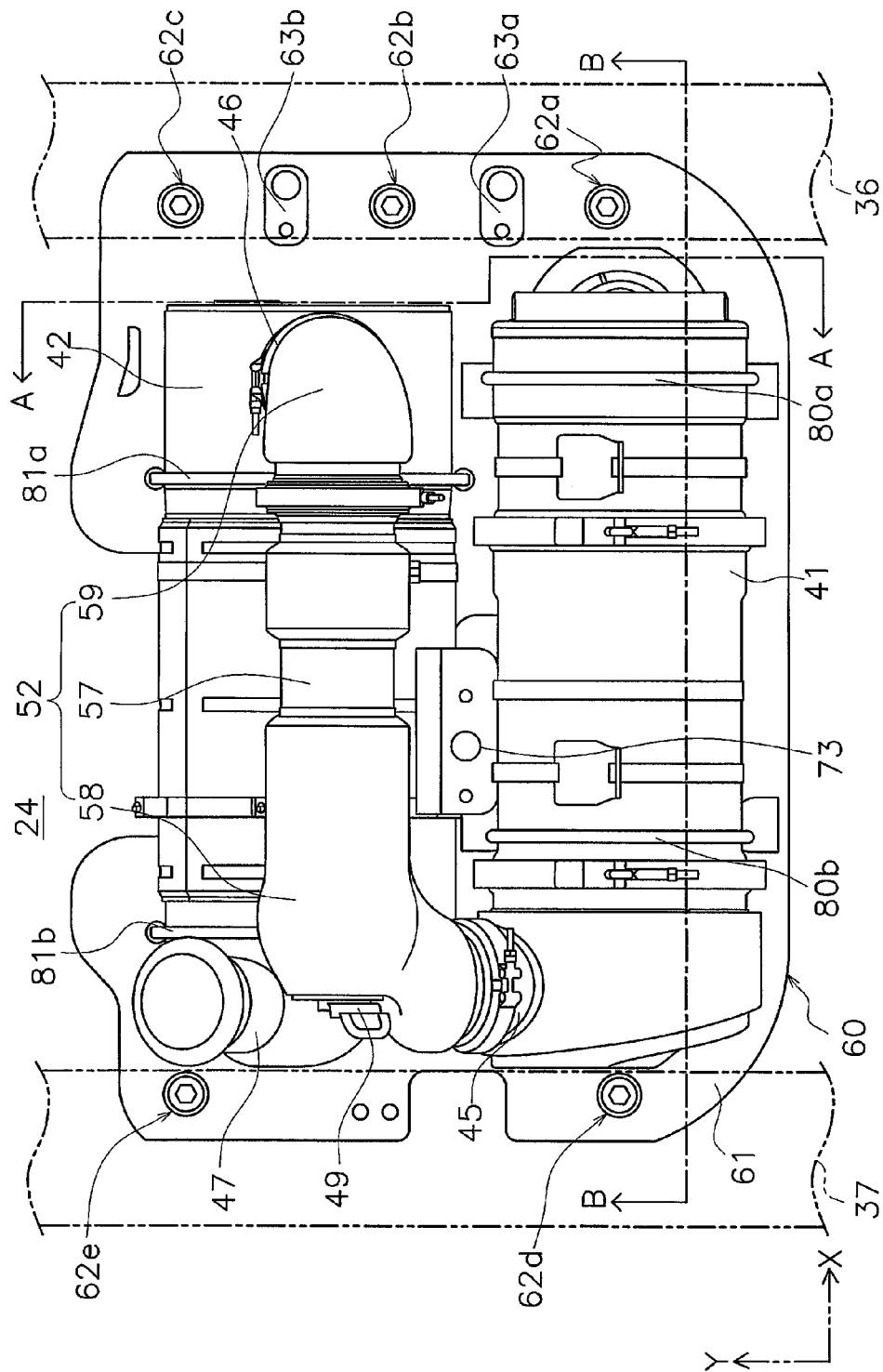
FIG. 4 is a plan view of an exhaust treatment unit in a first exemplary embodiment

As illustrated in FIG. 2, the exhaust treatment unit 24 is disposed above the hydraulic pump 23. FIG. 4 is an enlarged view of a part related to the exhaust treatment unit 24 in FIG. 3. In other words, FIG. 4 is a plan view of the exhaust treatment unit 24. In FIG. 4, some components, which are connected to but not included in the exhaust treatment unit 24, are depicted with two-dot chain lines. As illustrated in FIGS. 3 and 4, the exhaust treatment unit 24 includes a first exhaust treatment device 41, a second exhaust treatment device 42, a bracket 43 and a second connection pipe 52. As illustrated in FIGS. 3 and 4, the exhaust treatment unit 24 is bridged between the first beam member 36 and the second beam member 37. The exhaust treatment unit 24 is supported by the beam members 36 and 37. In other words, the first exhaust treatment device 41 and the second exhaust treatment device 42 are supported by the vehicle body frame 27. As illustrated in FIGS. 2 to 4, the first exhaust treatment device 41 and the second exhaust treatment device 42 are disposed in alignment with each other in the vehicle width direction.

In the present exemplary embodiment, the first exhaust treatment device 41 is a diesel particulate filter device, for instance, and is configured to treat the exhaust gas from the engine 21. The first exhaust treatment device 41 is configured to collect particulates contained in the exhaust gas by a filter. The first exhaust treatment device 41 is configured to burn collected particulates by a heater attached to the filter.

The first exhaust treatment device 41 has a roughly cylindrical contour. As illustrated in FIG. 3, the first exhaust treatment device 41 is disposed such that its center axis Ax1 is arranged along the back-and-forth direction. Therefore, the first exhaust treatment device 41 is disposed such that its center axis Ax1 is arranged perpendicularly to a direction in which the engine 21 and the hydraulic pump 23 are aligned with each other (the direction will be hereinafter referred to as a first direction). In other words, the first exhaust treatment device 41 is disposed such that its longitudinal direction is arranged perpendicularly to the first direction.

In the present exemplary embodiment, the second exhaust treatment device 42 is a selective catalytic reduction device, for instance, and is configured to treat the exhaust gas from the engine 21. The second exhaust treatment device 42 is configured to selectively reduce nitrogen oxide NOx by urea hydrolysis. The second exhaust treatment device 42 has a roughly cylindrical contour. The second exhaust treatment device 42 is disposed such that its center axis Ax2 is arranged along the back-and-forth direction. Therefore, the second exhaust treatment device 42 is disposed such that its center axis Ax2 is arranged perpendicularly to the first direction. In other words, the second exhaust treatment device 42 is disposed such that its longitudinal direction is arranged perpendicularly to the first direction. Further, the second exhaust treatment device 42 is disposed such that its center axis Ax2 is arranged in parallel to the center axis Ax1 of the first exhaust treatment device 41.

Figure 5:
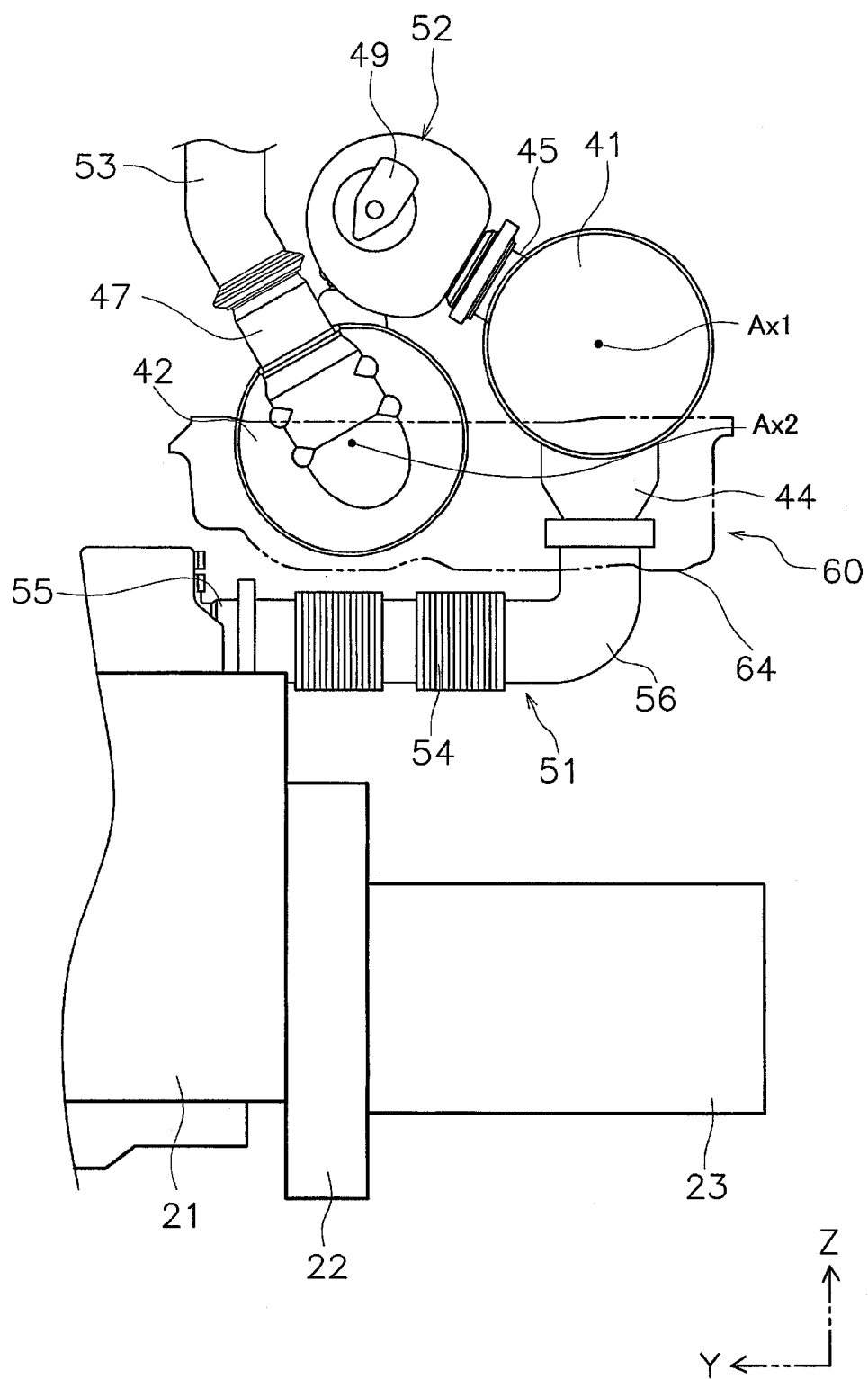
FIG. 5 is an enlarged view of the exhaust treatment unit and its vicinity of FIG. 2.
Figure 6:
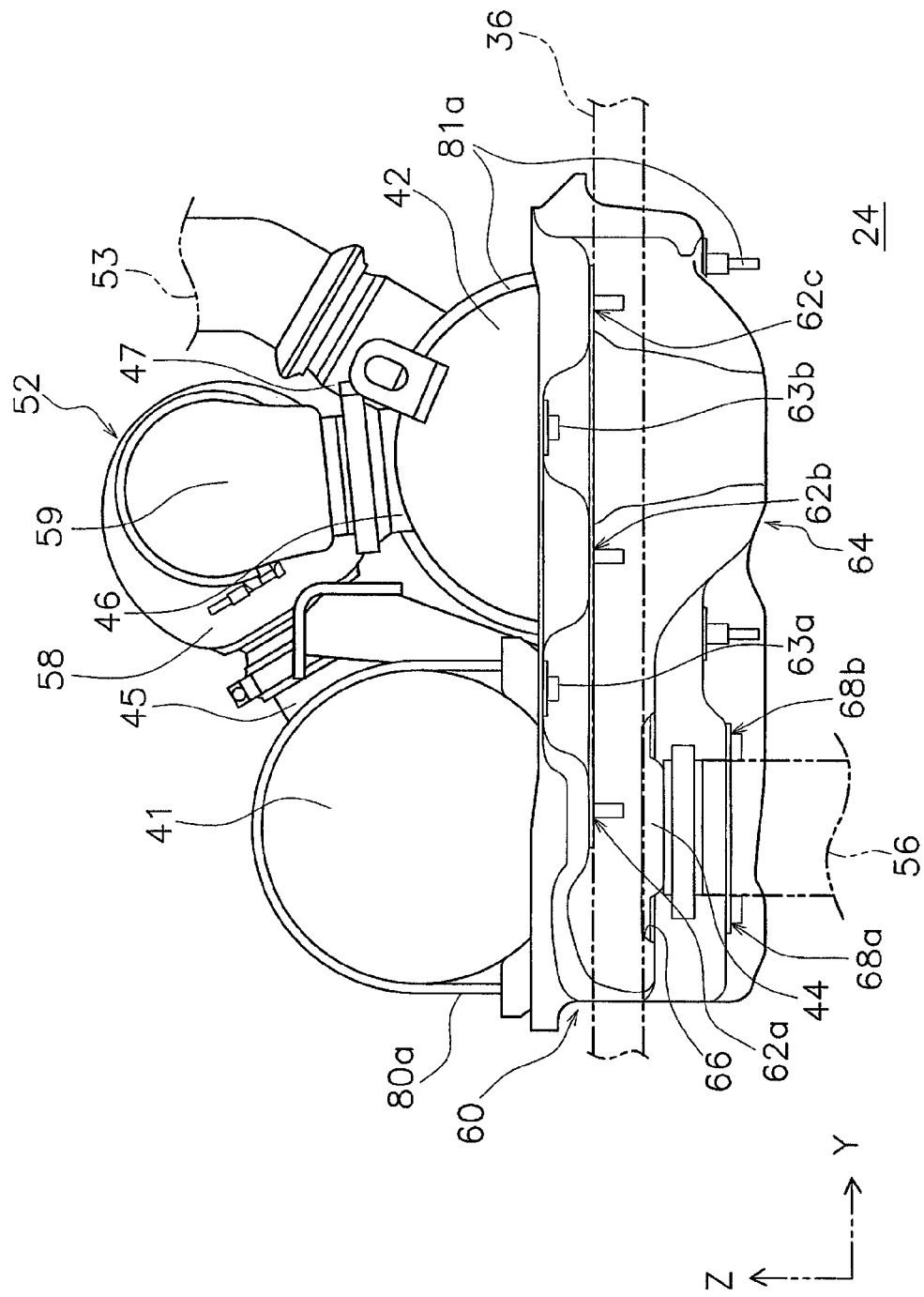
FIG. 6 is a diagram of the exhaust treatment unit of FIG. 5 seen from front.
Figure 7:
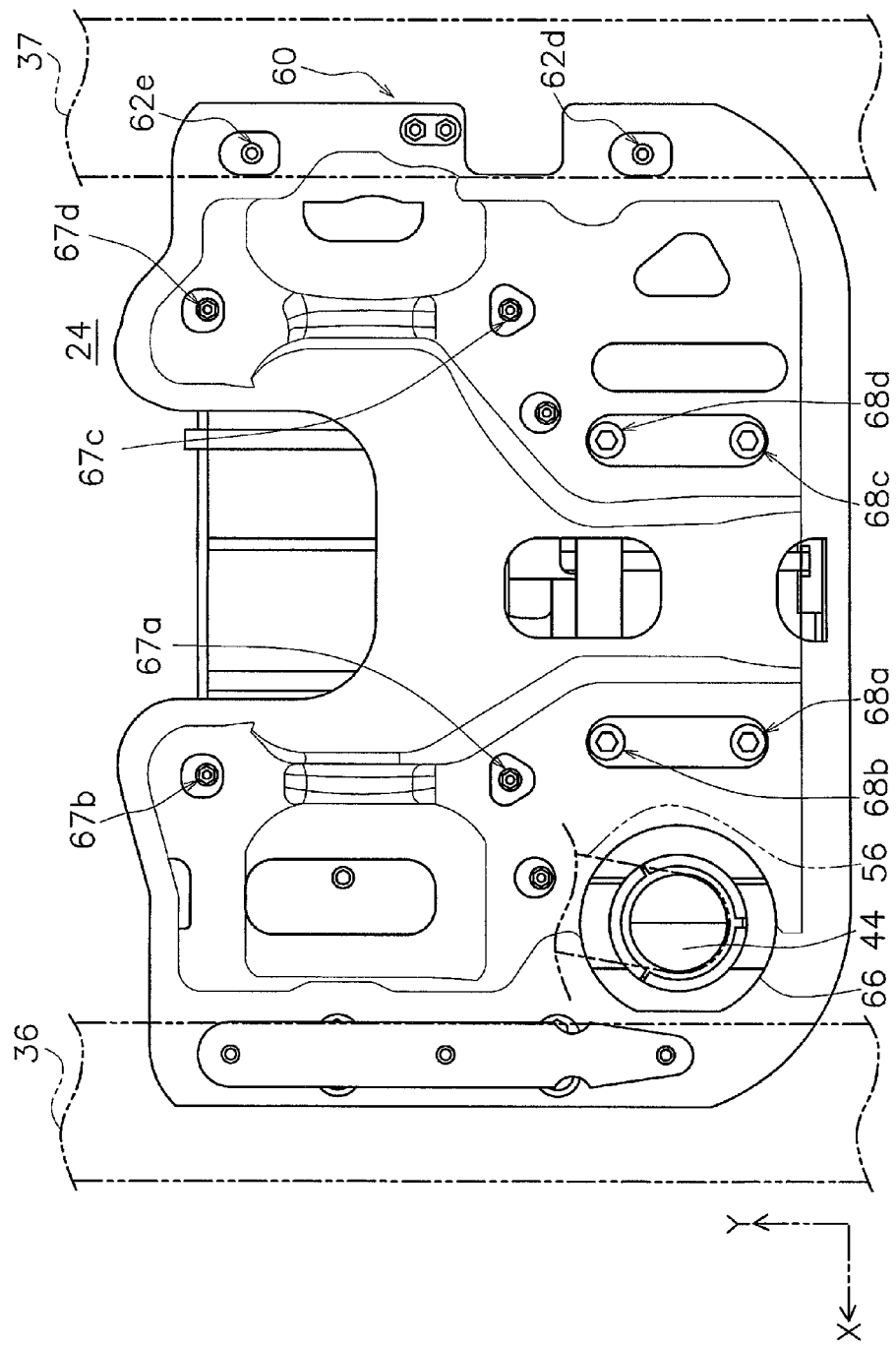
FIG. 7 is a bottom view of the exhaust treatment unit in the first exemplary embodiment.

FIG. 5 is an enlarged view of the exhaust treatment unit 24 and its vicinity in FIG. 2. It should be noted that in FIG. 5, for easy understanding, the contour of a main bracket 60 to be described hereinafter is depicted with a two-dot chain line without illustration of some components such as the vehicle body frame 27. FIG. 6 is a diagram of the exhaust treatment unit 24 in FIG. 5 seen from front. FIG. 7 is a bottom view of the exhaust treatment unit 24. In FIGS. 6 and 7, some components, which are connected to but not included in the exhaust treatment unit 24, are displayed with two-dot chain lines.

As illustrated in FIG. 5, the first exhaust treatment device 41 and the second exhaust treatment device 42 are disposed above the hydraulic pump 23. The bottom part of the second exhaust treatment device 42 is positioned below the top surface of the engine 21. As illustrated in FIGS. 5 to 7, the first exhaust treatment device 41 includes a first connection port 44.

As illustrated in FIG. 5, the work vehicle 100 includes a first connection pipe 51. The first connection pipe 51 couples the engine 21 and the first exhaust treatment device 41.

The first connection pipe 51 includes a bellows part 54 that can be extended and contracted. For example, the bellows part 54 is formed by coupling a plurality of bellows-type expansion and contraction joints. The bellows part 54 is horizontally disposed. Specifically, the bellows part 54 extends in the vehicle width direction. The bellows part 54 is disposed above the hydraulic pump 23. The bellows part 54 is partially positioned under the second exhaust treatment device 42. In other words, the first connection pipe 51 passes under the second exhaust treatment device 42.

The first connection pipe 51 includes a first curved portion 55 and a second curved portion 56. As illustrated in FIG. 3, the first curved portion 55 couples the bellows part 54 and the engine 21. In other words, one end of the first connection pipe 51 is connected to an exhaust port of the engine 21 via a supercharger 29. As illustrated in FIGS. 5 to 7, the second curved portion 56 couples the bellows part 54 and the first connection port 44. In other words, the other end of the first connection pipe 51 is connected to the first connection port 44 of the first exhaust treatment device 41.

Figure 8:
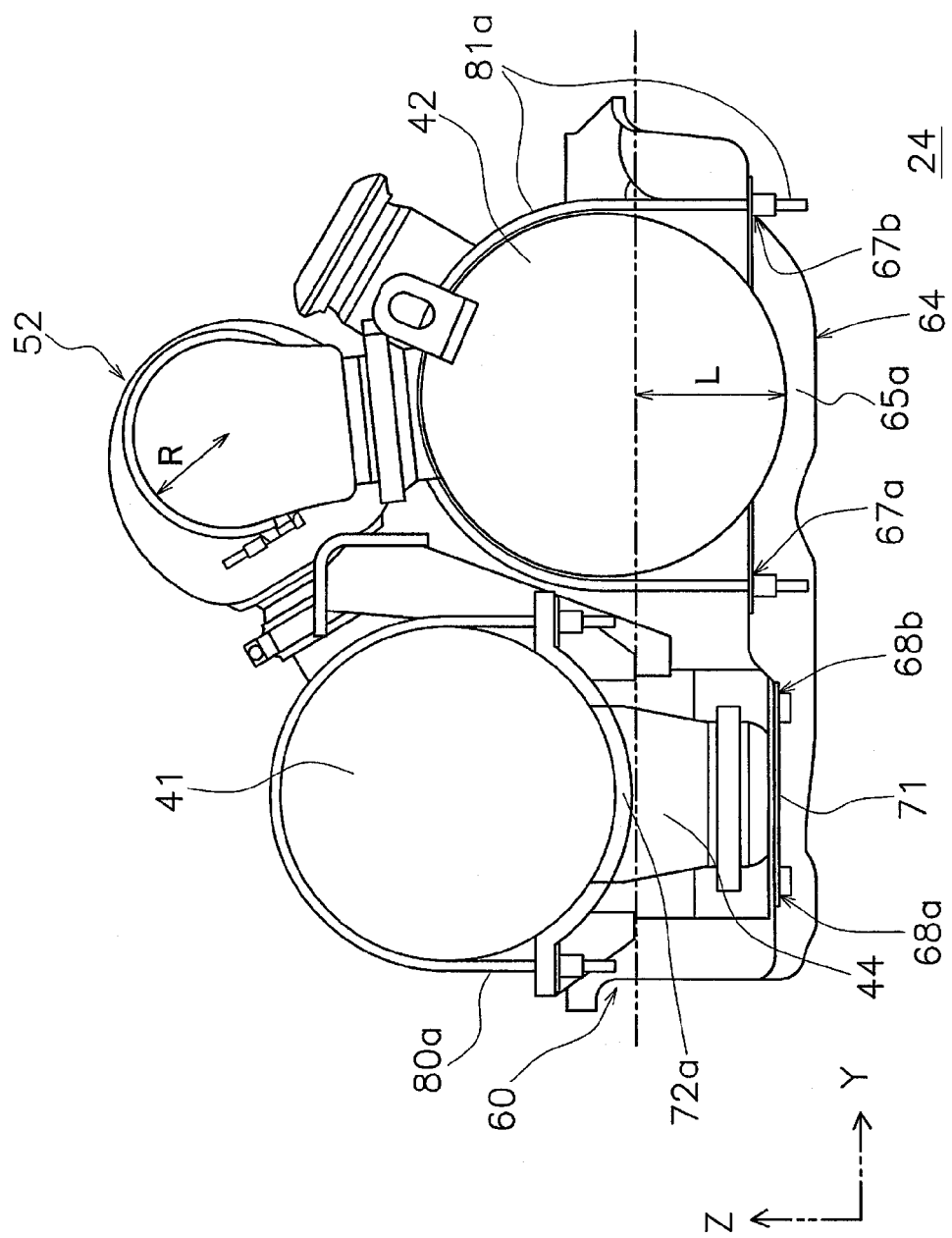
FIG. 8 is a cross-sectional view of the exhaust treatment unit seen in a direction of a cross-sectional line A-A in FIG. 4.
Figure 9:
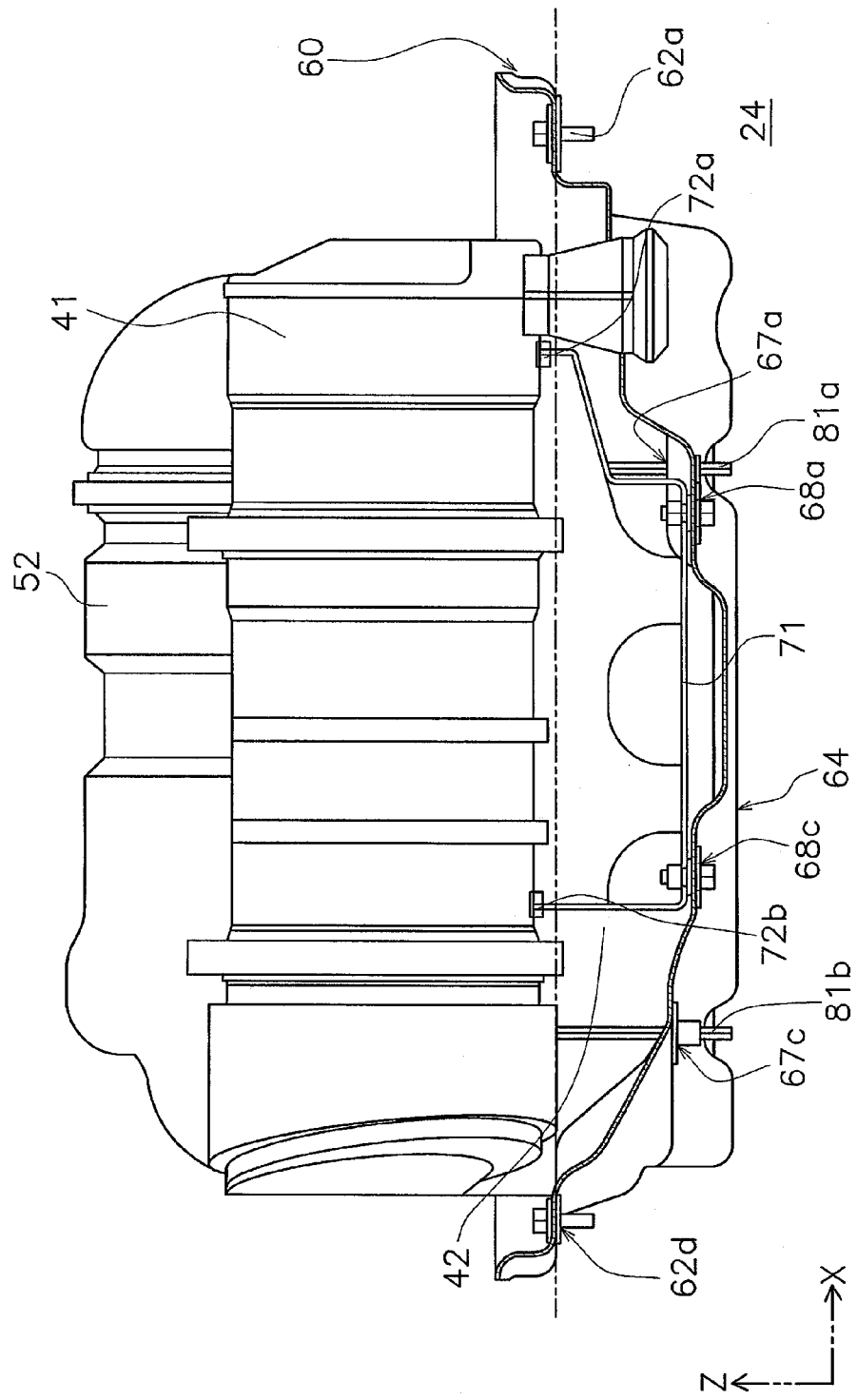
FIG. 9 is a cross-sectional view of the exhaust treatment unit seen in a direction of a cross-sectional line B-B in FIG. 4.

FIGS. 8 and 9 are cross-sectional views of the exhaust treatment unit seen in the directions of cross-sectional lines A-A and B-B in FIG. 4, respectively. As illustrated in FIGS. 5 and 7-9, the first connection port 44 is set on the lowermost part of the first exhaust treatment device 41. Therefore, the connection part between the first connection pipe 51 and the first exhaust treatment device 41 is positioned right below the first exhaust treatment device 41.

As illustrated in FIGS. 4 and 6, the first exhaust treatment device 41 includes a second connection port 45. The second connection port 45 protrudes obliquely upwards and in the vehicle width direction. The second exhaust treatment device 42 includes a third connection port 46. The third connection port 46 is positioned on the uppermost part of the second exhaust treatment device 42.

The exhaust treatment unit 24 includes the second connection pipe 52. One end of the second connection pipe 52 is connected to the second connection port 45 of the first exhaust treatment device 41. The other end of the second connection pipe 52 is connected to the third connection port 46 of the second exhaust treatment device 42. In other words, the second connection pipe 52 is a relay connection pipe for connecting the first exhaust treatment device 41 and the second exhaust treatment device 42. The second connection pipe 52 is disposed adjacently to the second exhaust treatment device 42 while being disposed over the second exhaust treatment device 42.

As illustrated in FIG. 4, the second connection pipe 52 includes a straight portion 57, a third curved portion 58 and a fourth curved portion 59. The straight portion 57 is positioned over the second exhaust treatment device 42. The third curved portion 58 couples the straight portion 57 and the second connection port 45. The fourth curved portion 59 couples the straight portion 57 and the third connection port 46. An aqueous urea injection device 49 is attached to the third curved portion 58. The aqueous urea injection device 49 is configured to inject aqueous urea into the second connection pipe 52.

As illustrated in FIG. 5, the second exhaust treatment device 42 includes a fourth connection port 47. The fourth connection port 47 protrudes obliquely upwards. Specifically, the fourth connection port 47 protrudes obliquely upwards and towards the engine 21. The aforementioned aqueous urea injection device 49 is positioned over the fourth connection port 47. However, the fourth connection port 47 is obliquely disposed to avoid interfering with the aqueous urea injection device 49. The work vehicle 100 is provided with an exhaust pipe 53. The exhaust pipe 53 is connected to the fourth connection port 47. The upper part of the exhaust pipe 53 protrudes upwardly from the engine hood 17.

The engine 21, the first connection pipe 51, the first exhaust treatment device 41, the second connection pipe 52, the second exhaust treatment device 42 and the exhaust pipe 53 are connected in series in this sequential order. Therefore, the exhaust gas from the engine 21 is transferred to the first exhaust treatment device 41 via the first connection pipe 51. In the first exhaust treatment device 41, particulates are mostly reduced from the exhaust gas. Next, the exhaust gas is transferred to the second exhaust treatment device 42 via the second connection pipe 52. In the second exhaust treatment device 42, NOx is mostly reduced. Subsequently, the cleaned exhaust gas is discharged to the outside via the exhaust pipe 53.

Figure 10:
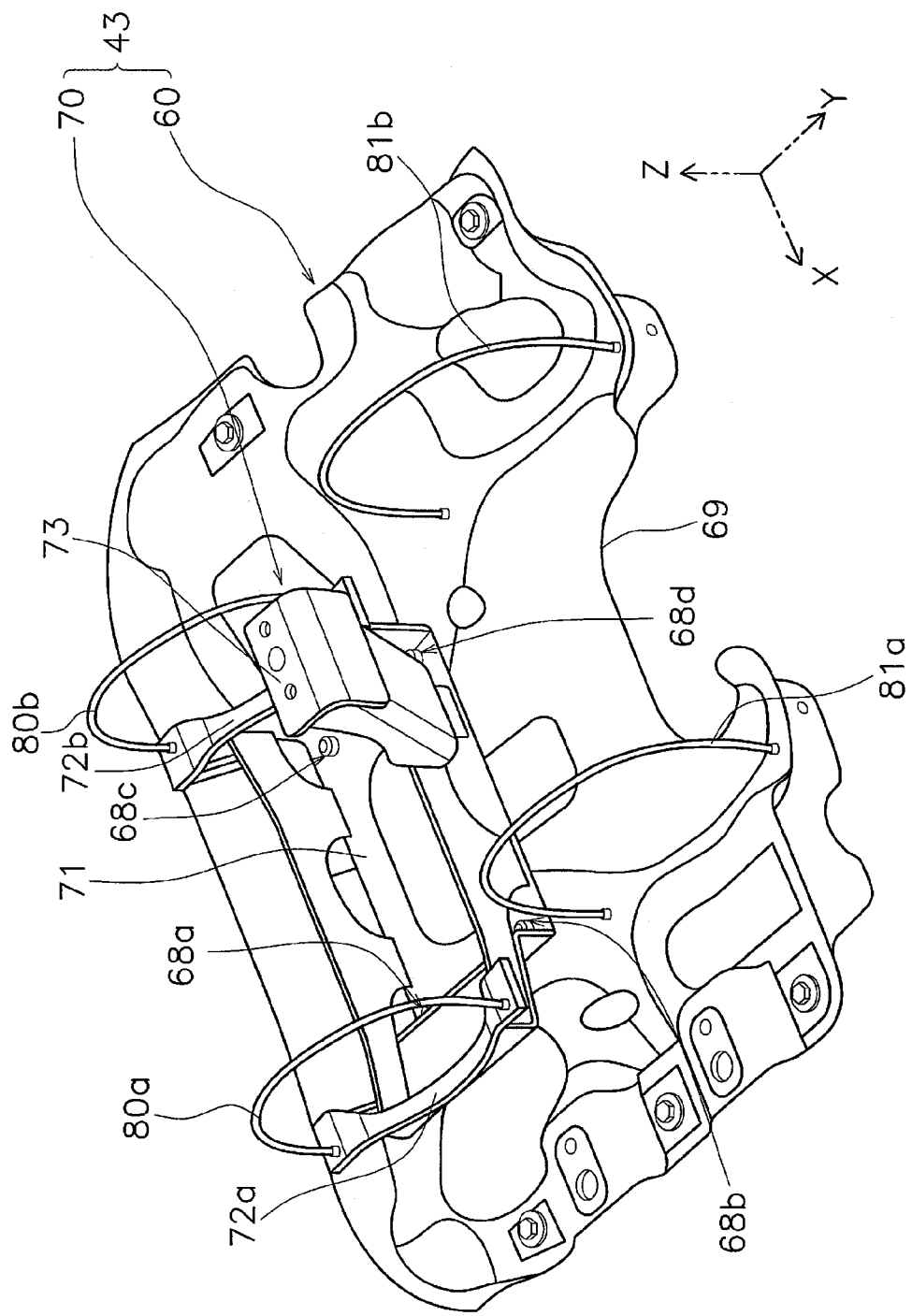
FIG. 10 is a perspective view of fixing components for the exhaust treatment device in the first exemplary embodiment.

The first exhaust treatment device 41 and the second exhaust treatment device 42 are attached to the bracket 43. FIG. 10 is a perspective view of fixing components for fixing the first exhaust treatment device 41 and the second exhaust treatment device 42 in the first exemplary embodiment. As illustrated in FIG. 10, the fixing components include the bracket 43, first grabbing components 80a and 80b and second grabbing components 81a and 81b. The bracket 43 includes the main bracket 60 and a sub-bracket 70.

The main bracket 60 is formed by means of stamping of a single member. The sub-bracket 70 is a member provided separately from the main bracket 60, and is attached to the main bracket 60. The first grabbing components 80a and 80b are mounted around the first exhaust treatment device 41 supported by first support portions 72a and 72b (to be described below in detail) of the sub-bracket 70. The first exhaust treatment device 41 is fixed on the sub-bracket 70 by the first grabbing components 80a and 80b and the first support portions 72a and 72b. The second grabbing components 81a and 81b are mounted around the second exhaust treatment device 42 supported by second support portions 65a and 65b (to be described below in detail) of the main bracket 60. The second exhaust treatment device 42 is fixed on the main bracket 60 by the second grabbing components 81a and 81 b and the second support portions 65a and 65b. Thus, the first exhaust treatment device 41, the second exhaust treatment device 42 and the bracket 43 are integrated.

Figure 11:
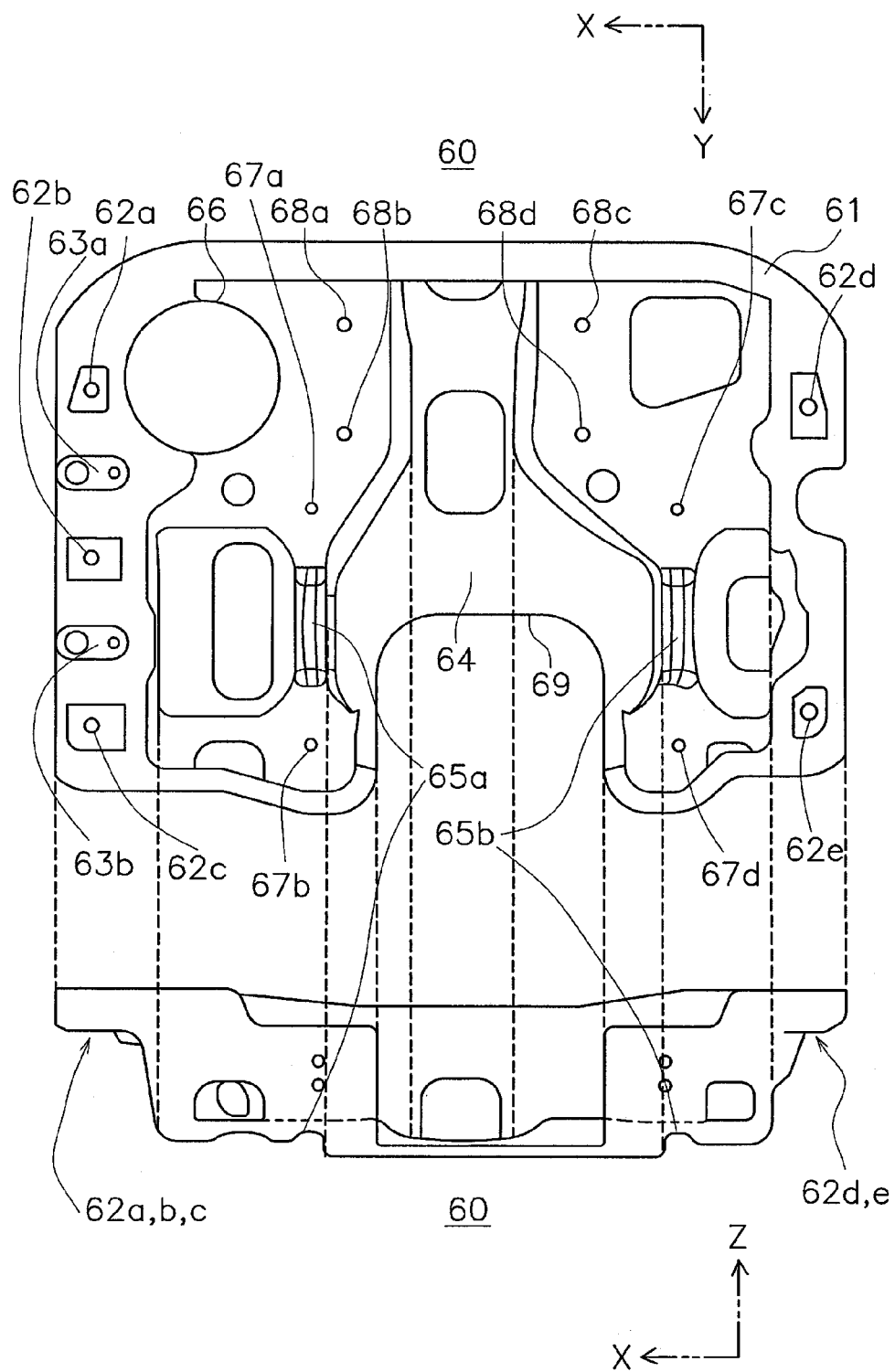
FIG. 11 includes a plan view and a front view of a main bracket in the first exemplary embodiment.

FIG. 11 illustrates a plan view and a front view of the main bracket 60 in the first exemplary embodiment. In FIG. 11, corresponding positions are connected with dotted lines for representing positional correspondence between the plan view and the front view. The main bracket 60 includes an edge part 61 and a main body part 64. The edge part 61 includes first attachment portions 62a, 62b, 62c, 62d and 62e and second attachment portions 63a and 63b. The main body part 64 includes the second support portions 65a and 65b, an insertion hole 66, third attachment portions 67a, 67b, 67c and 67d, fourth attachment portions 68a, 68b, 68c and 68d, and a cut-out portion 69. It should be noted that the main body part 64 further includes elements of the sub-bracket 70.

As illustrated in FIG. 4, the edge part 61 is disposed in the surrounding of the first exhaust treatment device 41 and the second exhaust treatment device 42 in a plan view. In more detail, the edge part 61 is disposed while enclosing at least three of the front, rear, right and left sides of the first and second exhaust treatment devices 41 and 42 in a plan view.

The first attachment portions 62a to 62e illustrated in FIG. 11 are attached to the vehicle body frame 27 of the work vehicle 100. In more detail, as illustrated in FIGS. 4 and 7, the first attachment portions 62a, 62b and 62c are attached to the first beam member 36, whereas the first attachment portions 62d and 62e are attached to the second beam member 37. The first attachment portions 62a to 62e are positioned on the same plane. As illustrated in FIGS. 4, 6 and 7, in the present exemplary embodiment, the main bracket 60 is attached to the beam members 36 and 37 with use of bolts and so forth. Accordingly, the first attachment portions 62a to 62e include holes. However, when another fixing means such as a latch is employed, the first attachment portions 62a to 62e may be formed in another shape or may include such members as hooks.

The bracket 43 is fixed to the vehicle body frame 27 by the first attachment portions 62a to 62e. In other words, the exhaust treatment unit 24 is fixed to the vehicle body frame 27. The first attachment portions 62a to 62e are detachably attached to the beam members 36 and 37. In other words, the exhaust treatment unit 24 is detachably attached to the vehicle body frame 27.

The second attachment portions 63a and 63b are used together with a fifth attachment portion 73 to be described hereinafter in order to attach/detach the exhaust treatment unit 24 to/from the vehicle. Specifically, the attachment/detachment work for the exhaust treatment unit 24 is performed by hoisting the exhaust treatment unit 24 with use of hooks as hoisting tool attached to the second attachment portions 63a and 63b and the fifth attachment portion 73. Further, while the hooks as hoisting tools are not attached to the second attachment portions 63a and 63b and/or the fifth attachment portion 73, another member may be attached to the work vehicle 100.

For instance, an example of such member is a cover for covering at least a part of the exhaust treatment unit. As illustrated in FIG. 6, the second attachment portions 63a and 63b are positioned above the first attachment portions 62a, 62b and 62c for facilitating attachment/detachment of the hooks of hoisting tools.

As illustrated in FIGS. 6, 8 and 9, the main body part 64 has a convex shape downwardly bulged from the edge part 61. It should be noted that the main body part 64 is positioned above the first connection pipe 51 as illustrated in FIG. 5. It should be noted that FIG. 5 depicts the contour of the main bracket 60 with a two-dot chain line. Therefore, in detaching the first exhaust treatment device 41, it is possible to avoid interference with the first connection pipe 51.

The second support portions 65a and 65b illustrated in FIG. 11 support the second exhaust treatment device 42. The second exhaust treatment device 42 has a roughly cylindrical contour, while the second support portions 65a and 65b have contact surfaces fitted to the outer peripheral surface of the second exhaust treatment device 42. More specifically, the second support portions 65a and 65b have contact surfaces formed in a convex shape bulged downwards. The main body part 64 and the contact surfaces of the second support portions 65a and 65b are all formed in convex shapes bulged downwards. Therefore, stamping of the main body part 64 and that of the second support portions 65a and 65b can be simultaneously performed.

The third attachment portions 67a to 67d illustrated in FIG. 11 include holes into which the second grabbing components 81a and 81b (see FIG. 10) for grabbing the second exhaust treatment device 42 are inserted. Each of the second grabbing components 81a and 81b includes screw grooves on the both ends thereof. As illustrated in FIGS. 6 to 8, the second grabbing components 81a and 81b are fixed, by means of nuts, to the third attachment portions 67a to 67d on the bottom surface of the main bracket 60, i.e., on the opposite side of where the second exhaust treatment device 42 is supported. As illustrated in FIGS. 8 and 9, the third attachment portions 67a to 67d are positioned above the lowermost surface of the main body part 64. Therefore, even when the second grabbing components 81a and 81b are inserted into the third attachment portions 67a to 67d, the tips of the second grabbing components 81a and 81b are not positioned below the lowermost surface of the main body part 64. It should be noted that means for fixing the second grabbing components 81a and 81b to the main bracket 60 are not limited to the aforementioned ones. The shapes and the positions of the third attachment portions 67a to 67d can be variously set in accordance with the fixing means.

The fourth attachment portions 68a to 68d illustrated in FIG. 11 include holes into which bolts for fixing the sub-bracket 70 to the main bracket 60 are inserted. As illustrated in FIGS. 6 to 10, the sub-bracket 70 and the main bracket 60 are fixed to each other with use of bolts and nuts. In other words, the sub-bracket 70 is detachably attached to the main bracket 60. Therefore, only the first exhaust treatment device 41 can be detached from the vehicle by detaching the sub-bracket 70 from the main bracket 60. In this case, the first connection pipe 51 is detached from the first connection port 44. The second connection pipe 52 is detached from the second connection port 45. Then, the sub-bracket 70 supporting the first exhaust treatment device 41 is detached from the main bracket 60. At this time, the first exhaust treatment device 41 is upwardly moved by hoisting it by means of a crane or the like.

As illustrated in FIGS. 6, 8 and 9, the fourth attachment portions 68a to 68d are positioned above the lowermost surface of the main body part 64. Accordingly, the bolts or the nuts, fixing the sub-bracket 70 and the main bracket 60 to each other, are not positioned below the lowermost surface of the main body part 64. It should be noted that means for fixing the sub-bracket 70 to the main bracket 60 are not limited to the aforementioned ones. The shapes and the positions of the fourth attachment portions 68a to 68d can be variously set in accordance with the fixing means.

As illustrated in FIG. 10, the sub-bracket 70 includes a bottom portion 71, the first support portions 72a and 72b and the fifth attachment portion 73. The fifth attachment portion 73 is used for the same application as the second attachment portions 63a and 63b. As illustrated in FIGS. 8 and 9, the bottom portion 71 contacts with a part of the main body part 64 (particularly, peripheral portions of the fourth attachment portions 68a to 68d). The bottom portion 71 is perforated to form holes corresponding to the fourth attachment portions 68a to 68d.

The first support portions 72a and 72b are positioned above the bottom portion 71. The first support portions 72a and 72b support the first exhaust treatment device 41. The first exhaust treatment device 41 has a roughly cylindrical contour, while the first support portions 72a and 72b have contact surfaces fitted to the outer peripheral surface of the first exhaust treatment device 41. More specifically, the first support portions 72a and 72b have contact surfaces formed in a convex shape bulged downwards. In the present exemplary embodiment, the first support portions 72a and 72b and the second support portions 65a and 65b are collectively referred to as a support part. In other words, the support part supports the first exhaust treatment device 41 and the second exhaust treatment device 42.

FIG. 8 depicts the height of the first attachment portions 62a, 62b and 62c with a two-dot chain line such that the height corresponds to the positions of these attachment portions in FIG. 6. FIG. 9 depicts the height of the first attachment portions 62a and 62d with a two-dot chain line such that the height corresponds to the positions of the attachment portions. According to FIGS. 8 and 9, the second support portions 65a and 65b are positioned below the first attachment portions 62a to 62e, whereas the first support portions 72a and 72b are positioned slightly above the first attachment portions 62a to 62e. In other words, the support part is partially positioned below the first attachment portions 62a to 62e. Further, the second support portions 65a and 65b are positioned below the first support portions 72a and 72b. Therefore, the second exhaust treatment device 42 is supported by the second support portions 65a and 65b while being positioned below the first exhaust treatment device 41. Further, as illustrated in FIG. 6, the first attachment portions 62a to 62e are attached on the beam members 36 and 37. Therefore, as illustrated in FIG. 8, the lowermost part of the first exhaust treatment device 41 is disposed above the beam members 36 and 37. Further, the bottom part of the second exhaust treatment device 42 is positioned below the beam members 36 and 37.

Moreover, as illustrated in FIG. 8, a vertical distance L between the lowermost part of the second exhaust treatment device 42 and the first attachment portions 62a to 62e is greater than a length R that is half of the outer diameter of the second connection pipe 52. Further, the second connection pipe 52 is disposed over the second exhaust treatment device 42. Therefore, it is possible to sufficiently suppress the height of the exhaust treatment unit 24 protruded from the vehicle body frame 27.

Next, as illustrated in FIGS. 6 and 7, the first connection port 44 is inserted into the insertion hole 66 of the main bracket 60. The first support portions 72a and 72b are positioned above the bottom portion 71. Therefore, as illustrated in FIGS. 6 and 8, the lowermost part of the first connection port 44 is positioned above the bottom surface of the main body part 64. Further, the lowermost part of the first connection port 44 is positioned above the bottom portion 71. Accordingly, the first connection port 44 does not contact with the ground even when the exhaust treatment unit 24 is detached form the work vehicle 100 and is placed on the ground. Furthermore, the first connection port 44 does not contact with the ground even when the sub-bracket 70 supporting the first exhaust treatment device 41 is detached from the main bracket 60 and is placed on the ground. Accordingly, the maintenance performance of the first exhaust treatment device 41 can be further enhanced.

Next, as illustrated in FIGS. 10 and 11, the main body part 64 of the main bracket 60 includes the cut-out portion 69. As illustrated in FIGS. 2, 3 and 5, when the second exhaust treatment device 42 is disposed closer to the engine 21 than the first exhaust treatment device 41, the cut-out portion 69 is provided adjacent to the second support portions 65a and 65b. Contrarily, when the first exhaust treatment device 41 is disposed closer to the engine 21 than the second exhaust treatment device 42, the cut-out portion 69 is preferably provided adjacent to the first support portions 72a and 72b. As illustrated in FIG. 3, the cut-out portion 69 is positioned over a cylinder head 21a of the engine 21. Therefore, the cylinder head 21a of the engine 21 is accessible from above through the cut-out portion 69. Due to the structure, the maintenance work for the engine 21 can be performed without detaching the exhaust treatment unit 24 from the work vehicle 100.

Advantageous Effects of First Exemplary Embodiment

The exhaust treatment unit 24 according to the present exemplary embodiment has the following features. The bracket 43 includes the main bracket 60 and the sub-bracket 70, and the second support portions 65a and 65b located on the main body part 64 of the main bracket 60 are positioned below the first attachment portions 62a to 62e located on the edge part 61. Therefore, the bottom part of the second exhaust treatment device 42 is positioned below the beam members 36 and 37 supporting the exhaust treatment unit 24. Accordingly, the exhaust treatment unit can be positioned lower, and thereby, enlargement of the work vehicle can be suppressed. In other words, the height of the engine hood can be restrained.

The first support portions 72a and 72b supporting the first exhaust treatment device 41 are positioned above the second support portions 65a and 65b supporting the second exhaust treatment device 42. Accordingly, the first exhaust treatment device 41 is disposed above the second exhaust treatment device 42. Therefore, this facilitates upwardly hoisting the first exhaust treatment device 41 and detaching it from the vehicle.

Second Exemplary Embodiment

In the first exemplary embodiment, explanation has been made for the case that the bracket 43 is formed by two members, i.e., the main bracket 60 and the sub-bracket 70. However, the bracket 43 may be formed by only a single member. In a second exemplary embodiment, with reference to FIGS. 12 to 14, explanation will be made for the case that the bracket 43 is formed by a single member formed by means of die forming.

Figure 12:
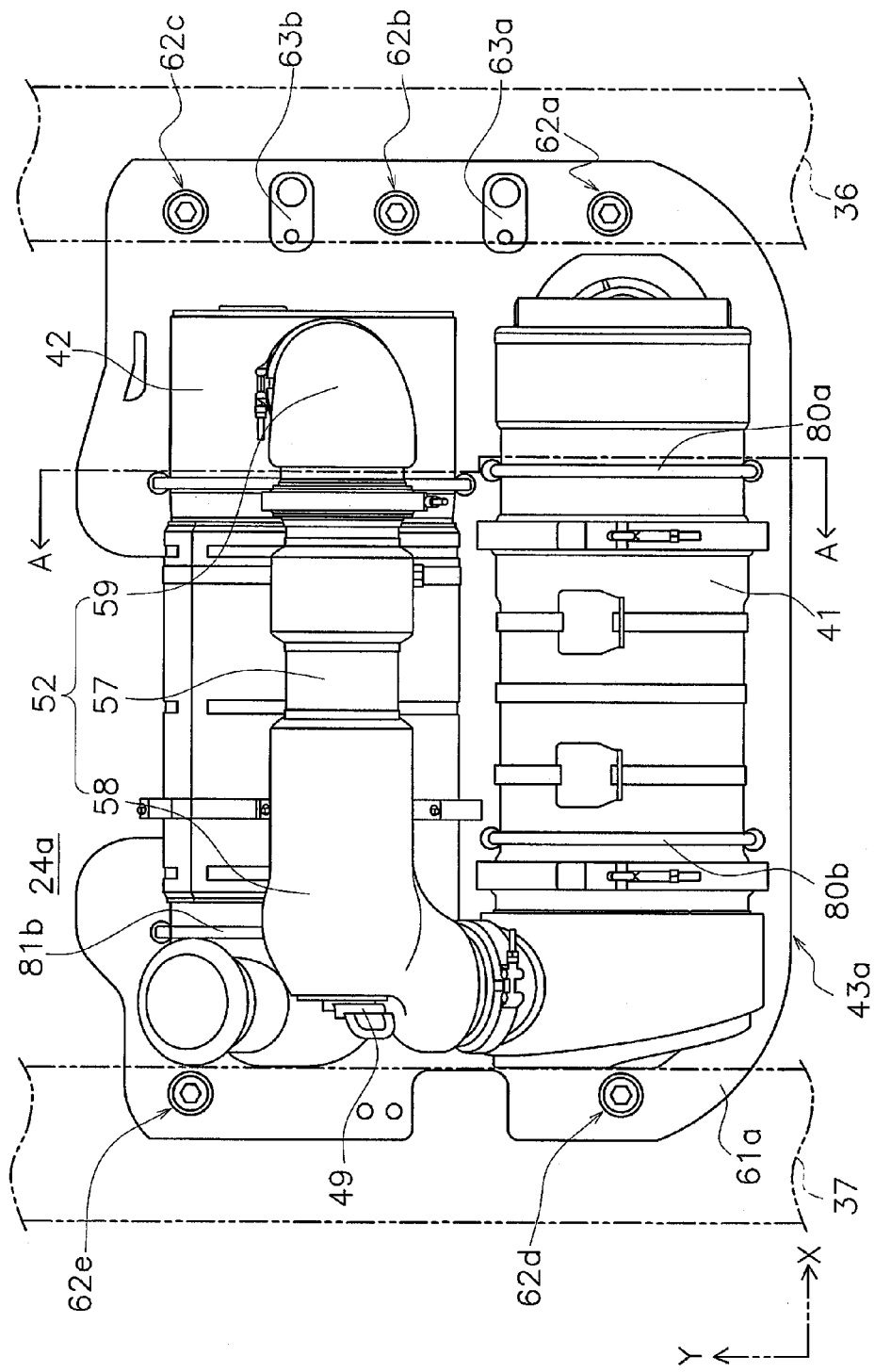
FIG. 12 is a plan view of an exhaust treatment unit in a second exemplary embodiment
Figure 13:
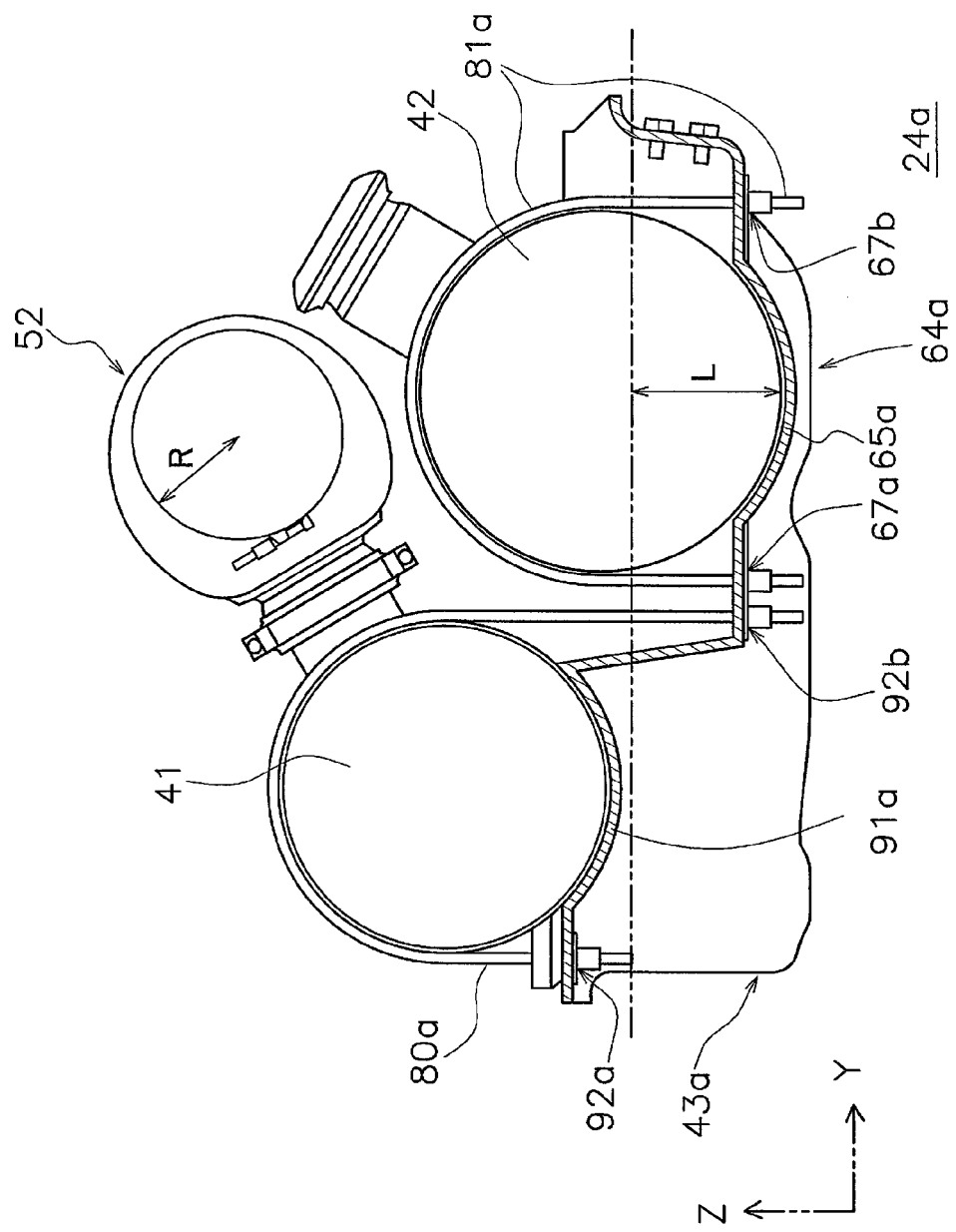
FIG. 13 is a cross-sectional view of the exhaust treatment unit seen in a direction of a cross-sectional line A-A in FIG. 12.
Figure 14:
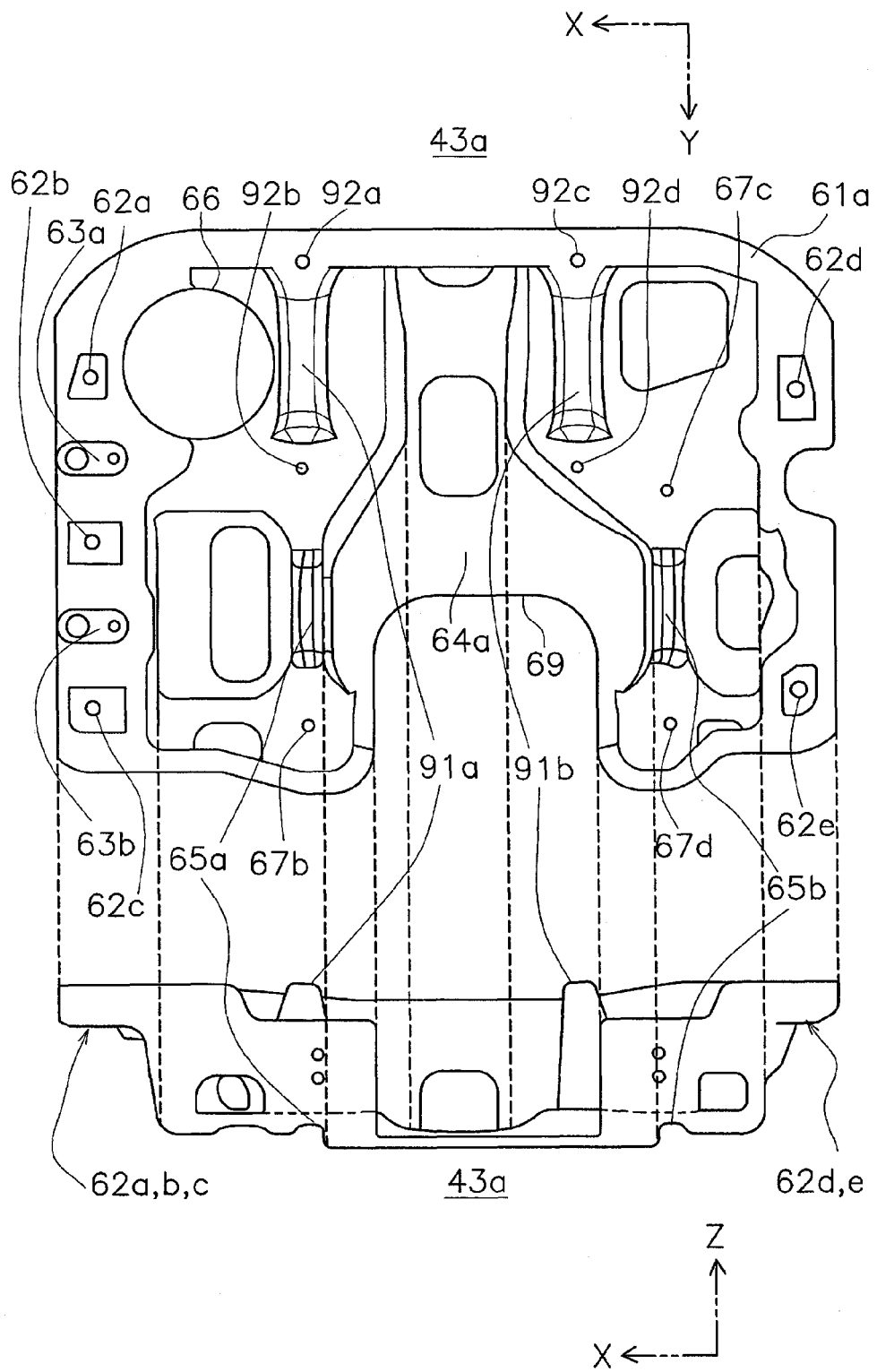
FIG. 14 includes a plan view and a front view that illustrate a main bracket in the second exemplary embodiment.

FIG. 12 is a plan view of an exhaust treatment unit 24a in the second exemplary embodiment. FIG. 13 is a cross-sectional view of the exhaust treatment unit 24a seen in the direction of a cross-sectional line A-A in FIG. 12. FIG. 14 includes a plan view and a front view of the bracket 43a in the second exemplary embodiment. The exhaust treatment unit 24a of the second exemplary embodiment is different from the exhaust treatment unit 24 of the first exemplary embodiment only in a point that the structure of the bracket 43 is replaced by that of a bracket 43a. The bracket 43a has a structure similar to that of the main bracket 60 of the first exemplary embodiment. In FIGS. 12 to 14, the same reference signs are assigned to elements having the same structures as those of the first exemplary embodiment. Explanation will not be made for the elements having the same structures as those of the first exemplary embodiment The bracket 43a is formed by stamping of a single member. As illustrated in FIG. 14, the bracket 43a includes an edge part 61a and a main body part 64a. The edge part 61a includes sixth attachment portions 92a and 92c in addition to the elements of the edge part 61 of the first exemplary embodiment. The main body part 64a includes first support portions 91a and 91b in addition to the elements of the main body part 64 of the first exemplary embodiment. Further, the main body part 64a includes sixth attachment portions 92b and 92d instead of the fourth attachment portions 68a to 68d.

As illustrated in FIG. 13, the first support portions 91a and 91b support the first exhaust treatment device 41. The first support portions 91a and 91b are formed by means of stamping. The first exhaust treatment device 41 has a roughly cylindrical contour, while the first support portions 91a and 91b have contact surfaces fitted to the outer peripheral surface of the first exhaust treatment device 41. More specifically, the first support portions 91a and 91b have contact surfaces formed in a convex shape bulged downwards. The height of the first support portions 91a and 91b from the bottom surface of the main body part 64a is the same as that of the first support portions 72a and 72b from the bottom surface of the main body part 64 in the first exemplary embodiment. In the present exemplary embodiment, the first support portions 91a and 91b and the second support portions 65a and 65b will be collectively referred to as a support part. In other words, the support part supports the first exhaust treatment device 41 and the second exhaust treatment device 42.

The sixth attachment portions 92a to 92d are holes into which the first grabbing components 80a and 80b for grabbing the first exhaust treatment device 41 are inserted. Each of the first grabbing components 80a and 80b includes screw grooves on the both ends thereof. The first grabbing components 80a and 80b are fixed, by means of nuts, to the sixth attachment portions 92a to 92d on the bottom surface of the bracket 43a, i.e., on the opposite side of where the first exhaust treatment device 41 is supported. In other words, the first grabbing components 80a and 80b are detachably attached to the bracket 43a. Therefore, only the first exhaust treatment device 41 can be detached from the vehicle by detaching the first grabbing components 80a and 80b from the bracket 43a. The other works in detaching only the first exhaust treatment device 41 from the vehicle are the same as those of the first exemplary embodiment.

FIG. 13 depicts the height of the first attachment portions 62a, 62b and 62c with a two-dot chain line such that the height corresponds to the positions of the attachment portions in FIG. 12. According to FIG. 13, the second support portions 65a and 65b are positioned below the first attachment portions 62a to 62e, whereas the first support portions 91a and 91b are positioned slightly above the first attachment portions 62a to 62e. In other words, the support part is partially positioned below the first attachment portions 62a to 62e. Further, the second support portions 65a and 65b are positioned below the first support portions 91a and 91b. Therefore, the second exhaust treatment device 42 is supported by the second support portions 65a and 65b while being positioned below the first exhaust treatment device 41. Further, the first attachment portions 62a to 62e are attached on the beam members 36 and 37. Therefore, as illustrated in FIG. 13, the lowermost part of the first exhaust treatment device 41 is disposed above the beam members 36 and 37. Further, the bottom part of the second exhaust treatment device 42 is positioned below the beam members 36 and 37.

Advantageous Effects of Second Exemplary Embodiment

The exhaust treatment unit 24a according to the present exemplary embodiment has the following features in addition to the features of the exhaust treatment unit 24 according to the first exemplary embodiment. In the bracket 43a according to the present exemplary embodiment, the main body part 64a, the contact surfaces of the first support portions 91a and 91b, and the contact surfaces of the second support portions 65a and 65b are all formed in convex shapes bulged downwards. Therefore, stamping of the main body part Ma, that of the first support portions 91a and 91b and that of the second support portions 65a and 65b can be simultaneously performed.

Modifications

The two exemplary embodiments of the present invention have been explained above. However, the present invention is not limited to the aforementioned exemplary embodiments, and a variety of changes can be made without departing from the scope of the present invention.

In the aforementioned exemplary embodiment, explanation has been made for the examples of applying the exhaust treatment units 24 and 24a to hydraulic excavators. However, the exhaust treatment units 24 and 24a may be applied to another work vehicle such as a bulldozer.

In the aforementioned exemplary embodiment, the first exhaust treatment device 41 has been explained as a diesel particulate filter device, whereas the second exhaust treatment device 42 has been explained as a selective catalytic reduction device. However, with the development of technology, it can be expected that the maintenance frequency of the selective catalytic reduction device becomes greater than that of the diesel particulate filter device. In such a case, the first exhaust treatment device 41 may be set as the selective catalytic reduction device, whereas the second exhaust treatment device 42 may be set as the diesel particulate filter device. It should be noted that it is preferable to firstly transfer the exhaust gas from the engine to the diesel particulate filter device. Therefore, in this case, it is preferable to form the insertion hole 66 between the second support portion 65a and the second attachment portion 63b in FIG. 11 or 14.

The first exhaust treatment device 41 may be disposed below the beam members 36 and 37. It should be noted that the first exhaust treatment device 41 is preferably disposed above the second exhaust treatment device 42.

The shape of the first exhaust treatment device 41 and that of the second exhaust treatment device 42 may not be limited to cylindrical shapes or the like, and may be other shapes such as an elliptic cylindrical shape or a rectangular parallelepiped shape.

The first direction may not be limited to the vehicle width direction, and may be another direction. In other words, the first exhaust treatment device 41 and the second exhaust treatment device 42 may be disposed in alignment with each other in a direction different from the vehicle width direction. For example, the first direction may be the vehicle back-and-forth direction. In other words, the first exhaust treatment device 41 and the second exhaust treatment device 42 may be disposed in alignment with each other in the vehicle back-and-forth direction.

The first exhaust treatment device 41 may be supported by any of the pillar members 31 to 35. The second exhaust treatment device 42 may be supported by any of the pillar members 31 to 35. The vehicle body frame 27, supporting the first exhaust treatment device 41 and the second exhaust treatment device 42, may not be limited to a component supporting the exterior cover 28. For example, a dedicated vehicle body frame configured to support the first exhaust treatment device 41 and the second exhaust treatment device 42 may be provided.

The number of the first support portions 72a and 72b (or 92a and 91b), that of the second support portions 65a and 65b, that of the first grabbing components 80a and 80b, and that of the second grabbing components 81a and 81b may not be respectively limited to two, and may be either one or three or more. In correspondence with the configuration, the number of the third attachment portions 67a to 67d and that of the sixth attachment portions 92a to 92d may be changed. Similarly, the number and so forth of the first attachment portions 62a to 62e, those of the second attachment portions 63a and 63b and those of the fourth attachment portions 68a to 68d may be arbitrarily changed.

Industrial Applicability

According to the present invention, it is possible to provide an exhaust treatment unit whereby enlargement of a work vehicle can be suppressed.

The invention claimed is:

1. An exhaust treatment unit for treating a work vehicle engine exhaust gas, the exhaust treatment unit comprising:
a main bracket;
a sub-bracket attached to the main bracket;
a first exhaust treatment device fixed to the main bracket;
a second exhaust treatment device fixed to the main bracket; and
the main bracket including
an edge part having an attachment portion configured to be attached to a work vehicle body frame part; and
a main body part having a convex shape downwardly bulged from the edge part, the main body part including a second support portion configured to support the second exhaust treatment device;
the sub-bracket including
a bottom part contacting a part of the main body part; and
a first support portion supporting the first exhaust treatment device, the first support portion being positioned above the bottom portion,
a bottom part of the second exhaust treatment device being positioned below the attachment portion.

2. The exhaust treatment unit according to claim 1, wherein the second support portion is positioned below the first support portion.

3. The exhaust treatment unit according to claim 2, wherein vertical distance between the attachment portion and the first support portion is less than a vertical distance between the attachment portion and the second support portion.

4. The exhaust treatment unit according to claim 2, further comprising:
a relay connection pipe connecting the first exhaust treatment device and the second exhaust treatment device,
the relay connection pipe being disposed over and adjacent to the second exhaust treatment device, and
a vertical distance between a lowermost part of the second exhaust treatment device and the attachment portion is greater than a length of half of an outer diameter of the relay connection pipe.

5. The exhaust treatment unit according to claim 1, wherein
the first exhaust treatment device is a diesel particulate filter device and the second exhaust treatment device is a selective catalytic reduction device, and
the selective catalytic reduction device is supported by the second support portion while being positioned below the diesel particulate filter device.

6. The exhaust treatment unit according to claim 1, wherein
the first exhaust treatment device includes a connection port between a connection pipe and the first exhaust treatment device on a lowermost part thereof, the connection pipe connecting the engine and the first exhaust treatment device, and
the main body part includes an insertion hole into which the connection port is inserted and a lowermost part of the connection port is positioned above a lowermost part of the main body.

7. The exhaust treatment unit recited in claim 6, wherein
the sub-bracket is detachably attached to the main bracket; and
the first exhaust treatment device is configured to be detached from the vehicle by detaching the sub-bracket from the main bracket.

8. A work vehicle including the exhaust treatment unit according to claim 6, the work vehicle further comprising:
an engine;
a vehicle body frame, the vehicle body frame including
a plurality of pillar members disposed upright on a revolving frame supporting the engine and
a beam member mounted to upper ends of the pillar member,
the exhaust treatment unit being supported by the vehicle body frame.

9. The work vehicle according to claim 8, wherein
the attachment portion of the main bracket is attached to the beam member and
a bottom part of the second exhaust treatment device is positioned below the beam member.

10. The work vehicle according to claim 8, further comprising:
a connection pipe connecting the engine and the first exhaust, treatment device,
the main body part is positioned above the connection pipe.

11. The work vehicle recited in claim 9, wherein
a lowermost part of the first exhaust treatment device is disposed above the beam member supporting the exhaust treatment unit.

12. The work vehicle according to claim 8, wherein
the main body part includes a cut-out portion, and
the cut-out portion is positioned over a cylinder head of the engine.

13. A work vehicle including the exhaust treatment unit according to claim 7, the work vehicle further comprising:
an engine;
a vehicle body frame, the vehicle body frame including
a plurality of pillar members disposed upright on a revolving frame supporting the engine and
a beam member mounted to upper ends of the pillar member,
the exhaust treatment unit being supported by the vehicle body frame.

14. The exhaust treatment unit according to claim 1, wherein
the first and second exhaust treatment devices have cylindrical shapes, and
the first and second support portions have contact surfaces respectively fitted to outer peripheral surfaces of the first and second exhaust treatment devices.

15. The exhaust treatment unit recited in claim 14, wherein
the contact surfaces have convex shapes bulged downwards.

16. A work vehicle including the exhaust treatment unit according to claim 1, the work vehicle further comprising:
an engine;
a vehicle body frame, the vehicle body frame including
a plurality of pillar members disposed upright on a revolving frame supporting the engine and
a beam member mounted to upper ends of the pillar member,
the exhaust treatment unit being supported by the vehicle body frame.

17. The work vehicle according to claim 16, wherein
the attachment portion of the main bracket is attached to the beam member and
a bottom part of the second exhaust treatment device is positioned below the beam member.

18. The work vehicle according to claim 16, further comprising:
a connection pipe connecting the engine and the first exhaust treatment device,
the main body part is positioned above the connection pipe.

19. The work vehicle recited in claim 17, wherein
a lowermost part of the first exhaust treatment device is disposed above the beam member supporting the exhaust treatment unit.

20. The work vehicle according to claim 16, wherein
the main body part includes a cut-out portion, and
the cut-out portion is positioned over a cylinder head of the engine.

* * * * *